(12) United States Patent
Wang

(10) Patent No.: US 11,338,196 B2
(45) Date of Patent: May 24, 2022

(54) GAME CONTROL METHOD, GAME CONTROL DEVICE, AND RECORDING MEDIUM THEREFOR

(71) Applicant: NEOWIZ CORPORATION, Seongnam-si (KR)

(72) Inventor: Jung Hyun Wang, Yongin-si (KR)

(73) Assignee: NEOWIZ CORPORATION, Seongnam-si (KR)

( * ) Notice: Subject to any disclaimer, the term of this patent is extended or adjusted under 35 U.S.C. 154(b) by 0 days.

(21) Appl. No.: 17/049,677

(22) PCT Filed: Nov. 21, 2018

(86) PCT No.: PCT/KR2018/014315
§ 371 (c)(1),
(2) Date: Oct. 22, 2020

(87) PCT Pub. No.: WO2019/208894
PCT Pub. Date: Oct. 31, 2019

(65) Prior Publication Data
US 2021/0129015 A1    May 6, 2021

(30) Foreign Application Priority Data

Apr. 27, 2018  (KR) .................. 10-2018-0049223

(51) Int. Cl.
*A63F 13/23* (2014.01)
*A63F 13/219* (2014.01)
(Continued)

(52) U.S. Cl.
CPC ............ *A63F 13/23* (2014.09); *A63F 13/219* (2014.09); *A63F 13/22* (2014.09); *A63F 13/24* (2014.09);
(Continued)

(58) Field of Classification Search
CPC ........ A63F 13/23; A63F 13/219; A63F 13/22; A63F 13/24; A63F 13/44; A63F 13/45;
(Continued)

(56) References Cited

U.S. PATENT DOCUMENTS 6,342,665 B1   1/2002  Okita et al.
6,347,998 B1   2/2002  Yoshitomi et al.
(Continued)

FOREIGN PATENT DOCUMENTS

KR   1020100135064 A   12/2010
KR   101203191-61      11/2012
(Continued)

OTHER PUBLICATIONS

Non-Final Office Action of the Taiwan Intellectual Property Office issued in Taiwan Patent Application No. 107141698, dated Oct. 25, 2019 with English Translation.
(Continued)

*Primary Examiner* — Thomas J Hong
*Assistant Examiner* — Carl V Larsen
(74) *Attorney, Agent, or Firm* — Harness, Dickey & Pierce, P.L.C.

(57) ABSTRACT

The present disclosure relates to a game control technology. An embodiment provides a computer-readable recording medium storing a program for executing a game control, the program being configured to implement: a display control function configured to conduct a control such that a note and an evaluation area indicator that indicates an evaluation area are displayed on a game screen, and to conduct a control such that at least one selected from the note and the evaluation area indicator is output while moving in a preset direction; a receiving function configured to receive an input signal of a user; an evaluation area determining function configured to determine at least one selected from the
(Continued)

position of the evaluation area, the shape thereof, and the size thereof on the basis of note characteristic information that is set with regard to each note; and an evaluation function configured to confirm whether or not the note is processed successfully on the basis of the input signal and information regarding proximity of the evaluation area indicator and the note.

13 Claims, 16 Drawing Sheets

(51) Int. Cl.
    *A63F 13/22*     (2014.01)
    *A63F 13/24*     (2014.01)
    *A63F 13/44*     (2014.01)
    *A63F 13/45*     (2014.01)
    *A63F 13/2145*     (2014.01)
    *A63F 13/814*     (2014.01)

(52) U.S. Cl.
    CPC .............. *A63F 13/44* (2014.09); *A63F 13/45* (2014.09); *A63F 13/2145* (2014.09); *A63F 13/814* (2014.09)

(58) Field of Classification Search
    CPC ... A63F 13/2145; A63F 13/537; A63F 13/814
    See application file for complete search history.

(56) References Cited

U.S. PATENT DOCUMENTS

| | | | |
|---|---|---|---|
| 8,226,483 B2 | 7/2012 | Endo | |
| 8,845,432 B2* | 9/2014 | O ........................ | A63F 13/426 463/37 |
| 10,328,340 B2 | 6/2019 | Wang et al. | |
| 2007/0087828 A1* | 4/2007 | Robertson ............. | A63F 13/216 463/42 |
| 2010/0222143 A1 | 9/2010 | Endo | |
| 2012/0240044 A1* | 9/2012 | Johnson .............. | G06F 3/04886 715/716 |
| 2013/0130761 A1* | 5/2013 | Hayashi .................. | A63F 13/44 463/7 |
| 2013/0157761 A1* | 6/2013 | Cichowlas .............. | A63F 13/42 463/31 |
| 2016/0193531 A1* | 7/2016 | Nishimura .......... | A63F 13/2145 463/31 |
| 2017/0021270 A1 | 1/2017 | Wang et al. | |
| 2017/0148258 A1 | 5/2017 | Takahashi et al. | |
| 2017/0189810 A1 | 7/2017 | Hong | |
| 2017/0296917 A1* | 10/2017 | Matsunami ........... | A63F 13/814 |
| 2018/0015368 A1* | 1/2018 | Katagai ............... | A63F 13/2145 |
| 2020/0324195 A1* | 10/2020 | Enokido ................ | G06F 3/0346 |

FOREIGN PATENT DOCUMENTS

| | | |
|---|---|---|
| KR | 1020130115015 A | 10/2013 |
| TW | 416859 B | 1/2001 |
| TW | 575450 B | 2/2004 |
| TW | I398282 B | 6/2013 |
| TW | I592199 B | 7/2017 |

OTHER PUBLICATIONS

International Search Report and Written Opinion of the ISA issued in PCT/KR2018/014315, dated Feb. 22, 2019; ISA/KR.

* cited by examiner

GAME CONTROL METHOD, GAME CONTROL DEVICE, AND RECORDING MEDIUM THEREFOR

CROSS-REFERENCE TO RELATED APPLICATIONS

This application is a U.S. National Phase Application under 35 U.S.C. 371 of International Application No. PCT/KR2018/014315, filed on Nov. 21, 2018, which claims priority under 35 U.S.C § 119(a) of Korean Patent Application No. 10-2018-0049223, filed on Apr. 27, 2018. The entire disclosures of the above applications are incorporated herein by reference.

In addition, this non-provisional application claims priorities in countries, other than the U.S., with the same reason based on the Korean Patent Applications, the entire contents of which are hereby incorporated by reference.

TECHNICAL FIELD

The present disclosure relates to a game control technology. More particularly, the present disclosure relates to a game control method, a game control device, and a recording medium therefor, wherein a game is controlled by using a user input that provides various evaluation functions according to constituent elements on a game screen.

BACKGROUND ART

There have been conventional games configured such that a marker for guiding the user's manipulation timing is displayed so as to move on a game screen, the marker is manipulated at a specific timing guided by the marker, and the manipulation is then evaluated, thereby providing a result. Such a conventional game has a problem in that the user is likely to lose interest in the game because the pattern of movement of the marker or the scheme of evaluation of the user's manipulation is too monotonous.

There is another problem in that the level of difficulty is simply set and fixed at the game starting point, and the game proceeds at the level of difficulty that is fixed within a single game play. If the user's level does not match with the level of difficulty, the user will lose interest in the process of playing the game at the fixed level of difficulty until the game is over.

DISCLOSURE OF INVENTION

Technical Problem

In this background, an aspect of the present disclosure is to provide a game control method, a game control device, and a recording medium therefor, wherein an evaluation area is determined variably according to a note of a game so as to variously interest the user.

Solution to Problem

In accordance with an aspect of the present disclosure, there is provided a computer-readable recording medium storing a program for executing a game control, the program being configured to implement: a display control function configured to conduct a control such that a note and an evaluation area indicator that indicates an evaluation area are displayed on a game screen, and to conduct a control such that at least one selected from the note and the evaluation area indicator is output while moving in a preset direction; a receiving function configured to receive an input signal of a user; an evaluation area determining function configured to determine at least one selected from the position of the evaluation area, the shape thereof, and the size thereof on the basis of note characteristic information that is set with regard to each note; and an evaluation function configured to confirm whether or not the note is processed successfully on the basis of the input signal and information regarding proximity of the evaluation area indicator and the note.

In accordance with another aspect of the present disclosure, there is provided a game control device including: a display controller configured to conduct a control such that a note and an evaluation area indicator that indicates an evaluation area are displayed on a game screen, and to conduct a control such that at least one selected from the note and the evaluation area indicator is output while moving in a preset direction; a receiver configured to receive an input signal of a user; an evaluation area determiner configured to determine at least one selected from the position of the evaluation area, the shape thereof, and the size thereof on the basis of note characteristic information that is set with regard to each note; and an evaluator configured to confirm whether or not the note is processed successfully on the basis of the input signal and information regarding proximity of the evaluation area indicator and the note.

In accordance with another aspect of the present disclosure, there is provided a game control method including: controlling a display by conducting a control such that a note and an evaluation area indicator that indicates an evaluation area are displayed on a game screen, and conducting a control such that at least one selected from the note and the evaluation area indicator is output while moving in a preset direction; receiving an input signal of a user; determining an evaluation area by determining at least one selected from the position of the evaluation area, the shape thereof, and the size thereof on the basis of note characteristic information that is set with regard to each note; and performing evaluation by confirming whether or not the note is processed successfully on the basis of the input signal and information regarding proximity of the evaluation area indicator and the note.

According to the present disclosure, the user can play a game following various evaluation areas determined according to note-specific characteristic information, and thus feel more interested in the game.

BRIEF DESCRIPTION OF DRAWINGS

The above and other aspects, features and advantages of the present disclosure will be more apparent from the following detailed description taken in conjunction with the accompanying drawings, in which.

MODE FOR THE INVENTION

Figure 1:
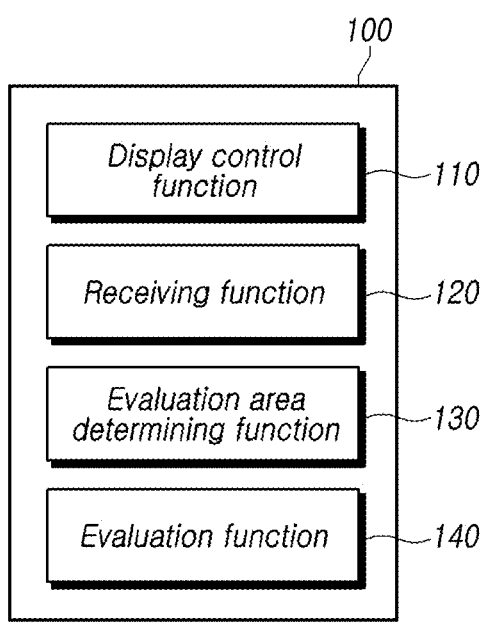
FIG. 1 illustrates a conceptual configuration of a recording medium according to an embodiment.

Hereinafter, embodiments of the present disclosure will be described in detail with reference to the accompanying drawings. In adding reference numerals to elements in each drawing, the same elements will be designated by the same reference numerals, if possible, although they are shown in different drawings. Further, in the following description of the present disclosure, a detailed description of known functions and configurations incorporated herein will be omitted when it is determined that the description may make the subject matter of the present disclosure rather unclear.

In addition, terms, such as first, second, A, B, (a), (b) or the like may be used herein when describing components of the present disclosure. These terms are merely used to distinguish one structural element from other structural elements, and a property, an order, a sequence and the like of a corresponding structural element are not limited by the term. It should be noted that if it is described in the specification that one component is "connected," "coupled" or "joined" to another component, a third component may be "connected," "coupled," and "joined" between the first and second components, although the first component may be directly connected, coupled or joined to the second component.

FIG. 1 illustrates a conceptual configuration of a recording medium according to an embodiment of the present disclosure.

A recording medium 100 storing a program for executing a game control according to an embodiment may include a function implementation configuration for implementing: a display control function 110 configured to conduct a control such that a note and an evaluation area indicator that indicates an evaluation area are displayed on a game screen, and to conduct a control such that at least one selected from the note and the evaluation area indicator is output while moving in a preset direction; a receiving function 120 configured to receive an input signal of a user; an evaluation area determining function 130 configured to determine at least one selected from the position of a preset evaluation area, the shape thereof, and the size thereof on the basis of note characteristic information that is set with regard to each note; and an evaluation function 140 configured to confirm whether or not the note is processed successfully on the basis of an input signal and information regarding proximity of the evaluation area indicator and the note.

Referring to FIG. 1, the display control function 110 conducts a control such that a note and an evaluation area indicator that indicates an evaluation area are displayed on a game screen. As needed, the display control function 110 may set multiple areas as track areas on the game screen, and may conduct a control such that respective track areas are separately configured. Specifically, the number of track areas may be determined according to the game setting or according to the selected level of difficulty, which has been selected by the user when starting the game. The track areas may be configured on the upper/lower sides of the game screen, on the left/right sides thereof, in specific shapes, or at predetermined angles. The track areas may also be configured in shapes such that the same are symmetric with reference to the center of the game screen.

Alternatively, the display control function 110 may conduct a control such that an evaluation area indicator appears on the game screen with regard to each track area. Specifically, the evaluation area indicator may be set to indicate an evaluation area for confirming whether or not a note is successfully processed. The evaluation area indicator may be displayed on one end of the game screen according to the direction of movement of the note, and may be displayed for each track area. That is, when the note moves from the upper side of the game screen to the lower side thereof, the evaluation area indicator may be displayed as a predetermined zone on the lower side of the track area. The display control function 110 may display evaluation area indicators such that the same is configured in various shapes and colors according to settings. For example, the display control function 110 may display evaluation area indicators in various shapes, such as squares, circles, and ellipses, and there is no restriction on the color. Accordingly, the display control function 110 may configure and display evaluation area indicators with regard to respective track areas according to the shape and color of the evaluation area indicators according to pre-stored game settings. Meanwhile, the display control function 110 may dynamically set the position in which the evaluation area indicator is displayed inside the game screen according to the level of difficulty of the game or according to the situation in which the game proceeds.

The display control function 110 may control the output of a displayed note such that the same moves toward the position of the evaluation area indicator along the track area. Specifically, the display control function 110 may display a note moving inside each track area configured on the game screen. Notes may be configured in various shapes and colors, and the display control function 110 may conduct a control such that respective notes are displayed in different shapes and colors according to the acquired score or the function held by respective notes.

Alternatively, the display control function 110 may conduct a control such that multiple notes are displayed on the game screen, and may conduct a control such that an evaluation area is displayed so as to overlap the notes. For example, the display control function 110 may conduct a control such that a predetermined note is displayed on the game screen for a predetermined time, and may conduct a control such that, when the time to process the displayed predetermined note expires, or when processing of the corresponding note is completed according to the user's input signal, the displayed note is changed.

Meanwhile, the display control function 110 may also display an evaluation area indicator for indicating an evaluation area on the game screen. For example, the evaluation area indicator may be displayed so as to move toward the note or toward the evaluation area as time elapses. Unlike this, the display control function 110 may conduct a control such that the note is displayed while moving toward the evaluation area indicator. Alternatively, the display control function 110 may conduct a control such that a time indicator is displayed on the game screen so as to evaluate the note. The time indicator may move toward the note, the evaluation area, or the evaluation area indicator during a predetermined time, and the user may generate an input signal with regard to the note or the evaluation area according to the position of the corresponding time indicator, thereby processing the corresponding note.

In addition, the display control function 110 may control display of each note according to the rate of movement of each note, which is determined according to at least one element selected from the level of difficulty of the game, the function of each note, and the score that can be acquired if the corresponding note is processed successfully. Likewise, when an evaluation area indicator moves toward a note, the display control function 110 may control display of the corresponding evaluation area indicator according to the rate of movement, which is determined according to at least one element selected from the level of difficulty of the game, the function of each note, and the score that can be acquired if the corresponding note is processed successfully.

As used in this specification, a note refers to an object used to evaluate the score in the case of a rhythm game or the like, and, when a note and an evaluation area indicator are positioned within a predetermined range, and when there is a user input, it may be confirmed that the corresponding note is processed successfully. The term "note" includes various meanings and encompasses terms such as a marker, an indicator, a target, and the like, and the terminology is not limited thereto.

Besides, the display control function 110 may control display of various effects necessary for the game. For example, the display control function 110 may conduct a control such that the acquired score is displayed inside the game, and may control output of various effects displayed according to whether or not the note is processed successfully. The display control function 110 may also configure a skill, a background image, or the like, which can be used by the user, inside the game screen, and may change an image output on the game screen, such as the game background, according to music that is output differently for each game. For example, it is possible to display a specific part of an image that has been set as the background screen, as the game proceeds, while constantly moving the same.

Meanwhile, the recording medium 100 storing a program for executing a game control may receive an input signal that is generated by the user while performing the game. The user's input signal may be a touch input signal generated by a signal when the game screen is touched, and may include various input signals such as an input signal resulting from key pad manipulation, a voice input signal, and an input signal through an image, without being limited thereto. Descriptions in this specification will be based on a touch input signal, but the same is solely to facilitate understanding, and all signals generated by the user for game manipulation can be applied to the present technical idea.

Alternatively, the user's input signal may be received through an input screen that is configured separately from the game screen on which the game situation is displayed. For example, in the case of a game device including a dual screen, one screen may display the game situation, and the other screen may be set for the purpose of receiving the user's touch input signal.

The recording medium 100 storing a program for executing a game control may include an evaluation area determining function 130 for determining an evaluation area according to the game situation. The evaluation area determining function 130 may determine at least one selected from the position of the evaluation area, the shape thereof, and the size thereof according to note characteristic information that has been set with regard to each note in advance. Evaluation areas may be classified into evaluation areas that are set on the basis of game initial driving or a reference note, and change evaluation areas for processing notes changed according to each note characteristic information. The evaluation areas refer to evaluation areas that are set by a default value or an initial value, and are set on a predetermined part of the game as evaluation areas for confirming whether or not notes that do not trigger an evaluation area change are treated successfully. The user can recognize the evaluation areas through evaluation area indicators as needed.

As an example, the evaluation area determining function 130 may make a determination such that an evaluation area is positioned to overlap at least one note displayed on the game screen as the game proceeds. Alternatively, it may be determined that an evaluation area is formed to successively overlap a note as the game proceeds.

As another example, the evaluation area determining function 130 may determine at least one selected from the position of an evaluation area, the size thereof, and the shape thereof such that, when the evaluation area is fixed and the note moves, the evaluation area is positioned in a specific position.

As another example, the evaluation area determining function 130 may make a determination such that, when the note is fixed and the evaluation area moves, the evaluation area is formed in a specific position, and at least one selected from the corresponding position, the size, and the shape is changed as the game proceeds.

Meanwhile, the evaluation area determining function 130 may change the evaluation area according to at least one selected from proceeding of the game, note characteristic information, and a preset trigger requirement. The following description will be made on the basis of a size change of the evaluation area, but the same can be applied to the position, size, shape, and the like. Alternatively, the same can be applied to a change by a combination of at least two selected from the position, size, and shape.

For example, the evaluation area determining function 130 may include the function of confirming whether or not there is a need to change the evaluation area with regard to the note on the basis of note-specific evaluation requirement information included in the note characteristic information, and determining at least one selected from the position of the change evaluation area for processing the note, the size thereof, the shape thereof, and the timepoint to change the same, according to the result of confirmation.

As an example, when it is confirmed that there is a need to change the size of the evaluation area, the evaluation area determining function 130 may set the size of the change evaluation area for processing the note by increasing/decreasing the size of the evaluation area by a preset ratio. In this case, the evaluation area indicator may also be changed and displayed so as to indicate the change evaluation area that has been changed.

As another example, when it is confirmed that there is a need to change the evaluation area, the evaluation area determining function 130 may set the size of the change evaluation area for processing the corresponding note such that the same is expanded to the entire game screen or to a partial area thereof.

As another example, when it is confirmed that there is a need to change the size of the reference evaluation area, the evaluation area determining function 130 may change and determine the shape or position of the change evaluation area for processing the corresponding note.

Meanwhile, when it is confirmed that there is a need to change the evaluation area, the evaluation area determining function 130 may select the change timepoint from the timepoint at which the corresponding note is displayed on the game screen and the timepoint at which the corresponding note is positioned within a predetermined range of the evaluation area indicator that indicates a preset evaluation area. For example, when an input signal is received at a timepoint at which the note is positioned within a preset range with reference to the evaluation area indicator that indicates the evaluation area, the evaluation area determining function 130 may make a determination such that the size, position, or shape of the evaluation area is changed to that of the change evaluation area for processing the note.

In addition, when processing of the note that has triggered a change of the evaluation area is completed, or when it is confirmed that processing of the corresponding note has failed, the evaluation area determining function 130 may change the position, shape, or position of the evaluation area to that of the existing evaluation area. Alternatively, the evaluation area determining function 130 may redetermine the evaluation area on the basis of the next note characteristic information.

When the evaluation area is changed to a change evaluation area for processing the note, the evaluation function 140 may confirm whether or not the corresponding note is processed successfully with reference to the change evaluation area. For example, the evaluation function 140 may confirm that the note is processed successfully when an input signal is received at a timepoint at which the evaluation area indicator of the evaluation area and the note are positioned within a preset first range, and when the input signal is continuously maintained for a predetermined time inside the change evaluation area.

Alternatively, when a note is displayed to as to include a starting point and an end point that are connected by a predetermined length, the evaluation function 140 may confirm that the corresponding note is processed successfully when the input signal is continuously maintained and continuously moved from a timepoint at which the starting point of the note and the evaluation area indicator of the evaluation area are positioned within a preset first range to a timepoint at which the end point of the note and the evaluation area indicator of the evaluation area are positioned within a preset second range.

Alternatively, the evaluation function 140 may confirm whether or not the note is processed successfully by further evaluating whether or not the shape that connects the starting point of the note and the end point thereof matches with the input pattern of the input signal that continues on the game screen or the input screen for a predetermined time.

Meanwhile, the above-mentioned notes for changing the evaluation area may be classified according to the form, shape, or color thereof. For example, a note is displayed so as to include a starring point and an end point that are connected by a predetermined length, and the evaluation function 140 may confirm that the note is processed successfully when a touch input signal continuously moves from a timepoint at which the starting point of the note reaches the evaluation area indicator of the reference evaluation area to a timepoint at which the end point of the note reaches the evaluation area indicator of the reference evaluation area.

Hereinafter, each configuration function of the computer-readable recording medium 100 storing an executable program, which has been described with reference to FIG. 1, will be described in more detail with reference to the drawings.

Figure 2:
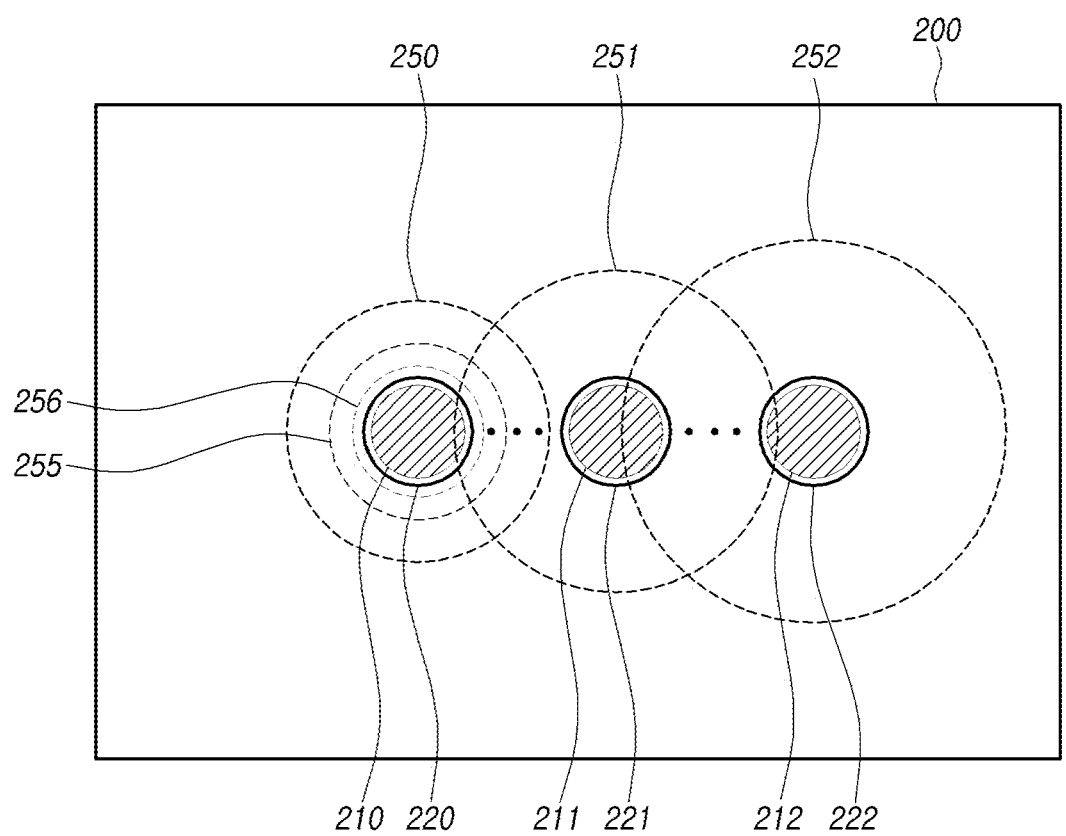
FIG. 2 illustrates an exemplary game display screen according to an embodiment.

FIG. 2 illustrates an exemplary game display screen according to an embodiment.

Referring to FIG. 2, there is illustrated a game screen 200 configured such that notes 210, 211, and 212 are displayed in fixed positions, and evaluation area indicators 220, 221, and 222 are displayed while moving. For example, the notes 210, 211, and 212 may be formed in various positions on the game screen 200 as the game proceeds, and the positions may also change as the game proceeds. It will be assumed in the following description that there are three notes 210, 211, and 212 on the game screen 200.

The position and size of the evaluation areas may be determined such that the same are positioned to overlap respective notes 210, 211, and 212. For example, when notes 210, 211, and 212 are displayed on the game screen 200, the position, shape, and size of evaluation areas 220, 221, and 222 may be determined such that the same overlap respective notes. Moreover, evaluation area indicators 250, 251, and 252 may be displayed while moving toward the notes 210, 211, and 212. For example, the evaluation area 250 may move toward the note 210 as the game proceeds, and the size thereof may decrease while the same moves as indicated by reference numerals 250, 255, and 256 as time elapses. If processing of the note 210 is completed, the size of the evaluation area indicator 251 may decrease as the same moves toward the note 210.

In this manner, the user touches the note at the timepoint at which the evaluation area indicator matches with the note, thereby generating a note processing operation.

Figure 3:
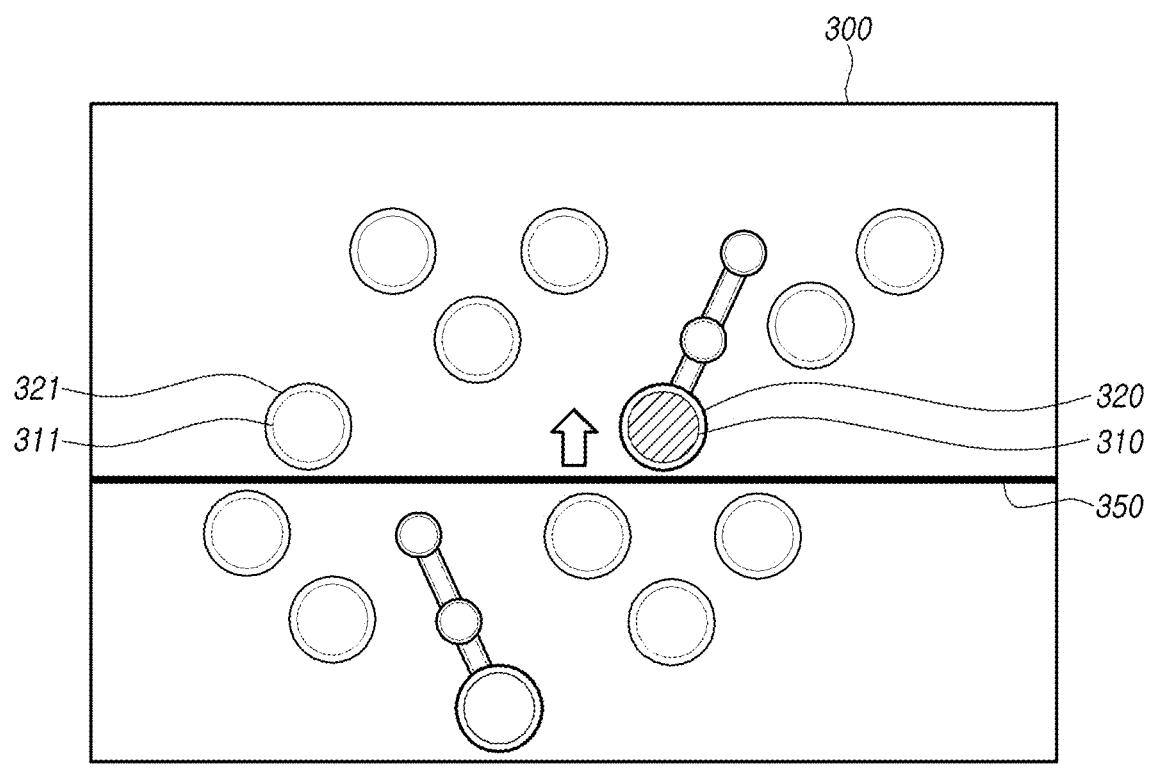
FIG. 3 illustrates an exemplary game display screen according to another embodiment.

FIG. 3 illustrates an exemplary game display screen according to another embodiment.

Unlike FIG. 2, an evaluation area indicator may be displayed while moving in one direction on the game screen 300 in FIG. 3.

Referring to FIG. 3, at least one selected from the size, position, and shape of evaluation areas 320 and 321 may be determined such that the same overlap notes 310 and 311. Thereafter, the evaluation area indicator 350 may be moved in a preset direction as the game proceeds.

An input signal may be input from the user at a timepoint at which the evaluation area indicator 350 and the notes 310 and 311 are positioned within a predetermined range as the evaluation area indicator 350 moves, thereby performing operations to process the corresponding notes 310 and 311. For example, it may be confirmed that the notes 310 and 311 are processed successfully only if the user touches the notes 310 and 311 on the game screen 300 the moment the evaluation area indicator 350 reaches the notes 310 and 311, and only if the user maintains the input signal to the end of the note in the case of the note 310, unlike the case of the note 311.

Figure 4:
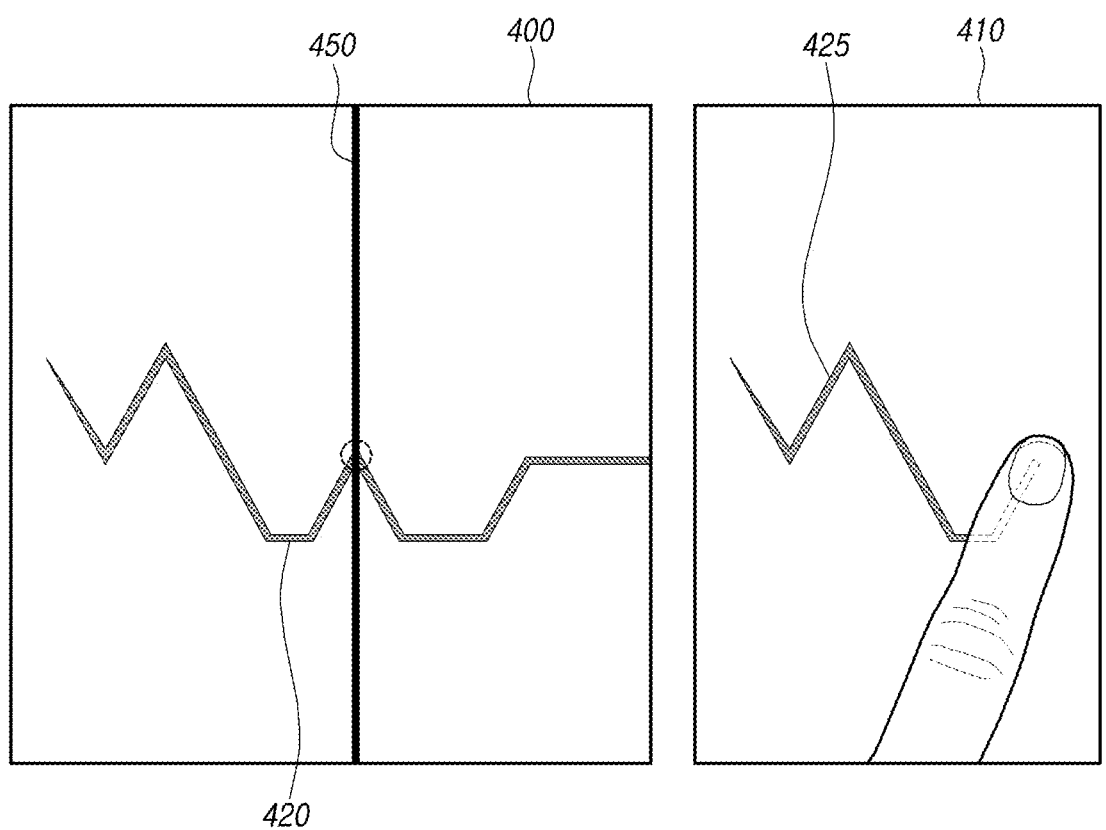
FIG. 4 illustrates a case in which the game screen and the input screen are separated according to an embodiment.

FIG. 4 illustrates a case in which the game screen and the input screen are separated according to an embodiment.

Referring to FIG. 4, the game screen 400 and the input screen 410 may be separated. For example, the game screen 400 may be configured on the front surface of the game device that drives the same, and the input screen 410 may be configured on the rear surface of the game device. Alternatively, the game screen 400 and the input screen 410 may be both configured on a single surface of the game device one above the other. The game screen 400 may be configured to display information for game proceeding, notes, evaluation area indicators, and the like, and the input screen 410 may be configured to receive user inputs.

It will be assumed in the following description with reference to FIG. 4 that the note 420 is configured as a single line that continuously extends. That is, the note 420 may be displayed such that the starting point thereof exists when the game starts, and the same is connected by a single line until the game is over. In this case, the evaluation area indicator 450 may move in a predetermined direction as the game proceeds. Alternatively, the evaluation area indicator 450 may be fixed in a predetermined position, and the note 420 may move instead.

As an example, when the evaluation area indicator 450 is fixed in a specific position on the game screen 400, the user plays the game by inputting a touch input signal on the evaluation area indicator 450 while moving the same in the upward/downward direction according to the movement of the note 420 toward the corresponding evaluation area indicator 450.

As another example, when the evaluation area indicator 450 moves from a specific position on the game screen 400 to another position, the user may generate a touch input signal according to the shape of the note 420 such that the input pattern of the input signal appears in the same shape as that of the note 420. Specifically, when the evaluation area indicator 450 moves, the input pattern 425 formed on the input screen 410 according to the user's input signal may have the same shape as that of the note 420. If necessary, confirming whether or not the corresponding note is processed may be based on whether or not the shapes are identical.

Figure 5:
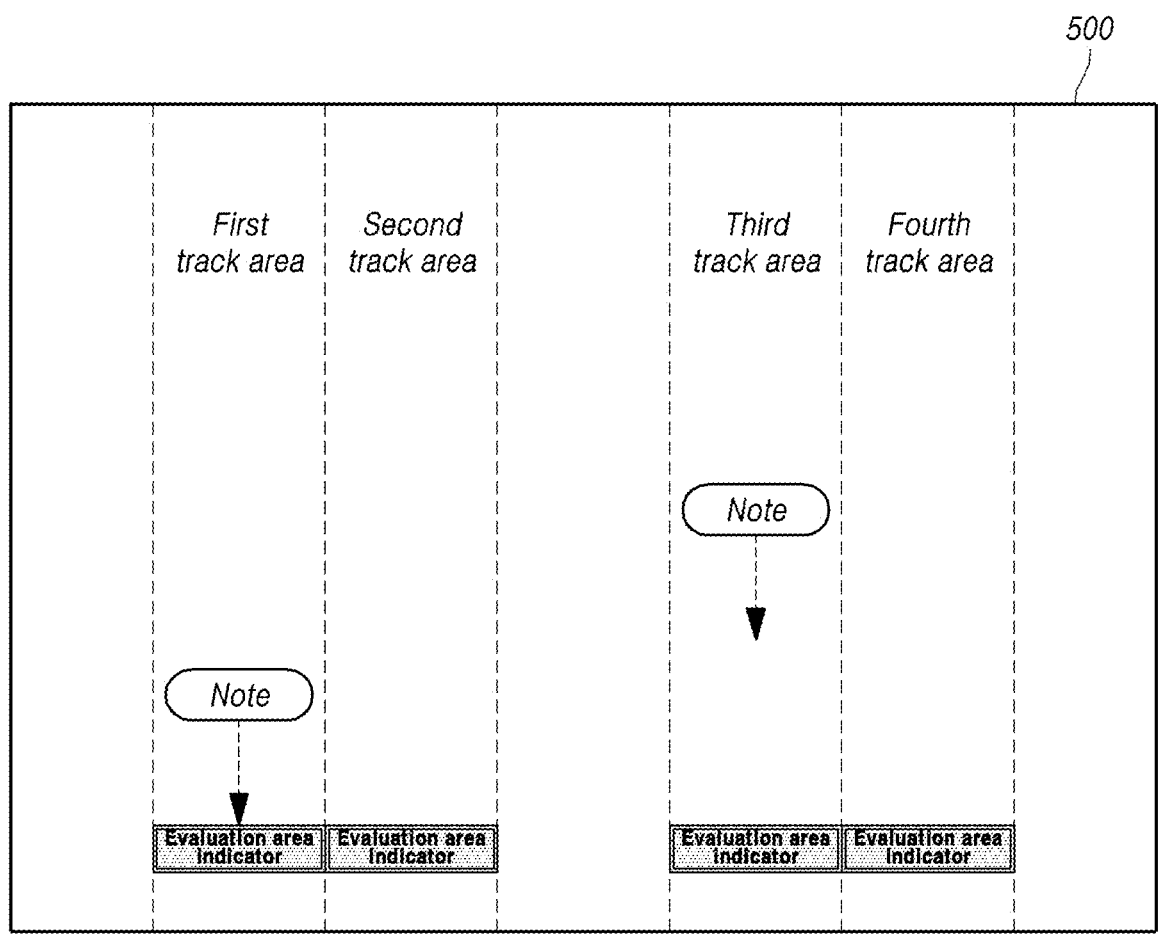
FIG. 5 illustrates an exemplary game display screen in a note moving type according to an embodiment.

FIG. 5 illustrates an exemplary game display screen in a note moving type according to an embodiment.

Referring to FIG. 5, the game screen 500 may be configured in the upward/downward direction. It is to be noted that the same is only an exemplary illustration for convenience of description, and the same may be configured in the leftward/rightward direction as described above, or in various shapes including a circular shape. For example, multiple track areas may be configured on the game screen 500, and notes may be displayed so as to move along respective track areas. Meanwhile, evaluation area indicators may be configured for respective track areas so as to confirm whether or not the notes are processed successfully. As an example, a total of four track areas are configured on the game screen 500, and respective notes are displayed so as to move toward the evaluation area indicators in the first and third track areas. It is possible to control the position in which the notes are generated, the rate of movement thereof, and the like so as to interwork with the music of the corresponding game such that the user can feel the rhythm of the music. That is, when the user selects game music with a fast beat, the rate of generation/movement of the notes may be set to be fast according to the beat. In addition, the position in which the notes are generated may also be determined according to the rhythm of the music. Information regarding game settings, such as the position in which notes are generated according to each piece of music, the type of notes, and the rate of movement of the notes, may be stored in the storage space of the game device that runs the corresponding game, and may be controlled under the control of the display control function 110.

Figure 6:
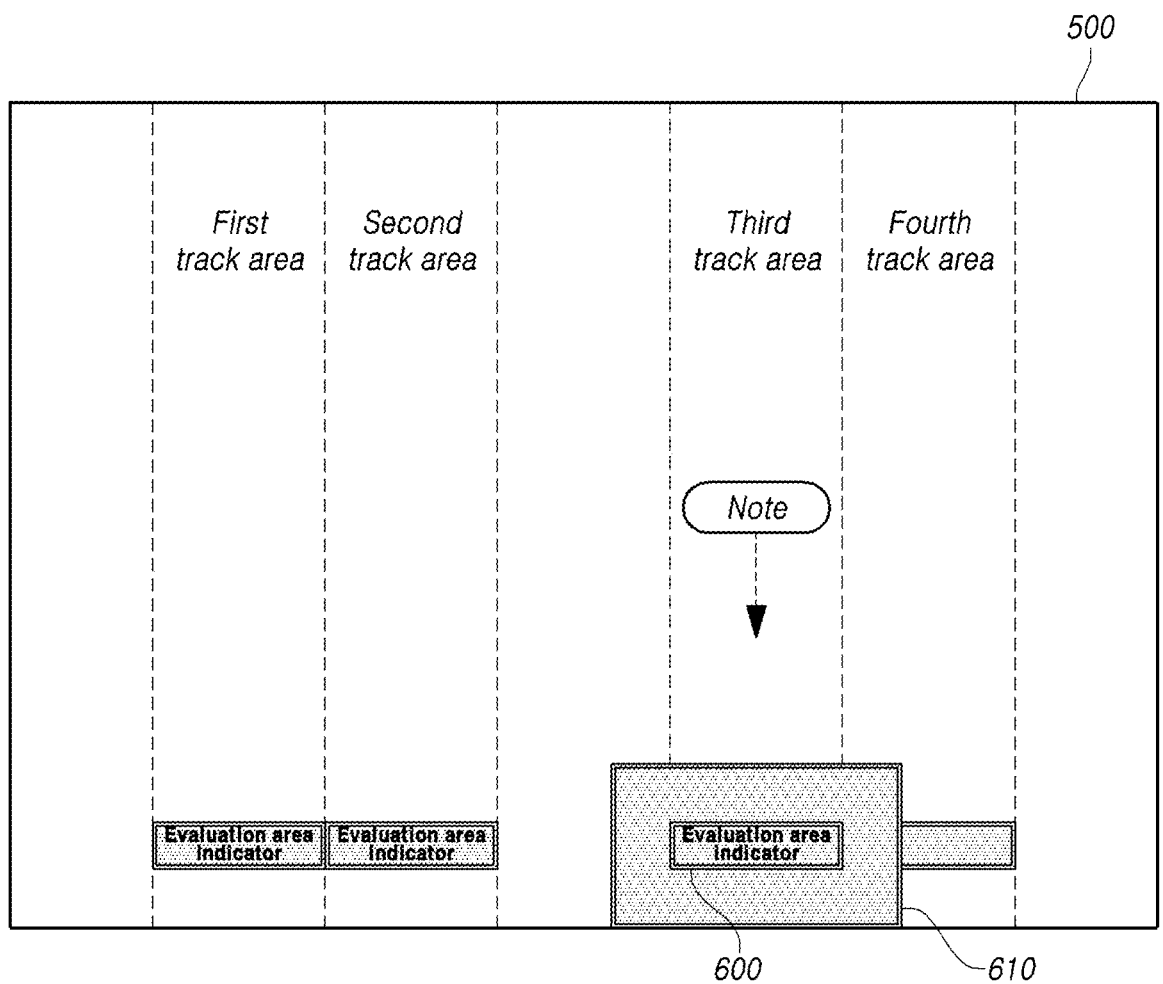
FIG. 6 illustrates a change in size of an evaluation area at a predetermined ratio according to an embodiment.

FIG. 6 illustrates a change in size of an evaluation area according to a predetermined ratio according to an embodiment.

Referring to FIG. 6, the evaluation area determining function 130 may change the position, shape, or size of an evaluation area on the basis of note characteristic information of a specific note. The following description will be made in connection with a varying size, but the position or shape may also be varied in the same concept as described above. For example, the note characteristic information may include information regarding evaluation requirements for respective notes, and the note characteristic information may have been set in advance. The information regarding evaluation requirements for respective notes may include information regarding the time of duration of a user input signal for confirming whether or not the corresponding note is processed successfully, the input type of the input signal, the starting timepoint of the input signal or the end timepoint thereof, the position of the input signal, evaluation area size setting, evaluation area shape setting, and evaluation area color setting.

When a specific note needs to be processed, the evaluation area determining function 130 may check note characteristic information of the corresponding note and may change the size of the evaluation area 600 according to the note characteristic information. For example, when a specific note is generated such that the user needs to process the same, the size of the evaluation area may be expanded according to a preset ratio with reference to a preset evaluation area 600, thereby determining the size of the change evaluation area 610 for processing the corresponding note. In this case, the evaluation area indicator may also be displayed according to the outer peripheral line of the changed evaluation area size.

In addition, not only the size of the evaluation area for processing the corresponding note is simply increased at a ratio with reference to the evaluation area 600, but the position of the evaluation area may also be changed, and the size may be increased/decreased at a preset ratio according to the changed position. That is, although the corresponding note is moving along the third track area, the evaluation area may be configured in the second track area, and the evaluation area size in this case may be expanded and displayed like the above-mentioned area 610. This provides the user with a difficulty of having to touch an evaluation area in a track different from the track in which the note is displayed, thereby preventing the game from being monotonous.

Figure 7:
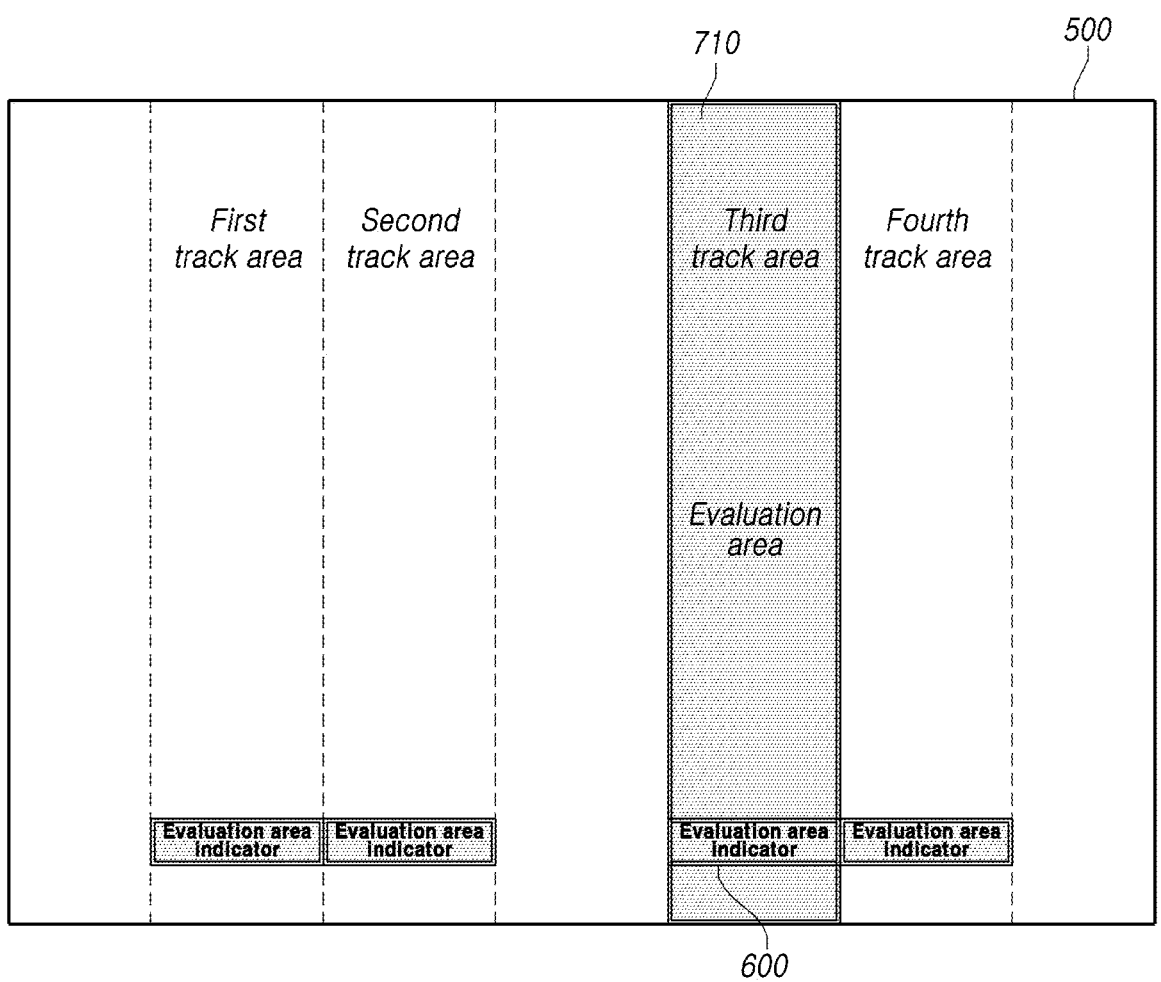
FIG. 7 illustrates a change in size of an evaluation area to a track area according to an embodiment.

FIG. 7 illustrates a change in size of an evaluation area to a track area according to an embodiment.

Referring to FIG. 7, the size of an evaluation area regarding a specific note may be extended to a partial area of the game screen 500. For example, according to a specific note, the evaluation area 600 may be extended to the entire track area in which the corresponding note moves, becoming a change evaluation area 710.

In this case, the position and size of the evaluation area may be changed simultaneously such that the same corresponds to the entire track area, which is different from the track in which the corresponding note is displayed, as described above.

Figure 8:
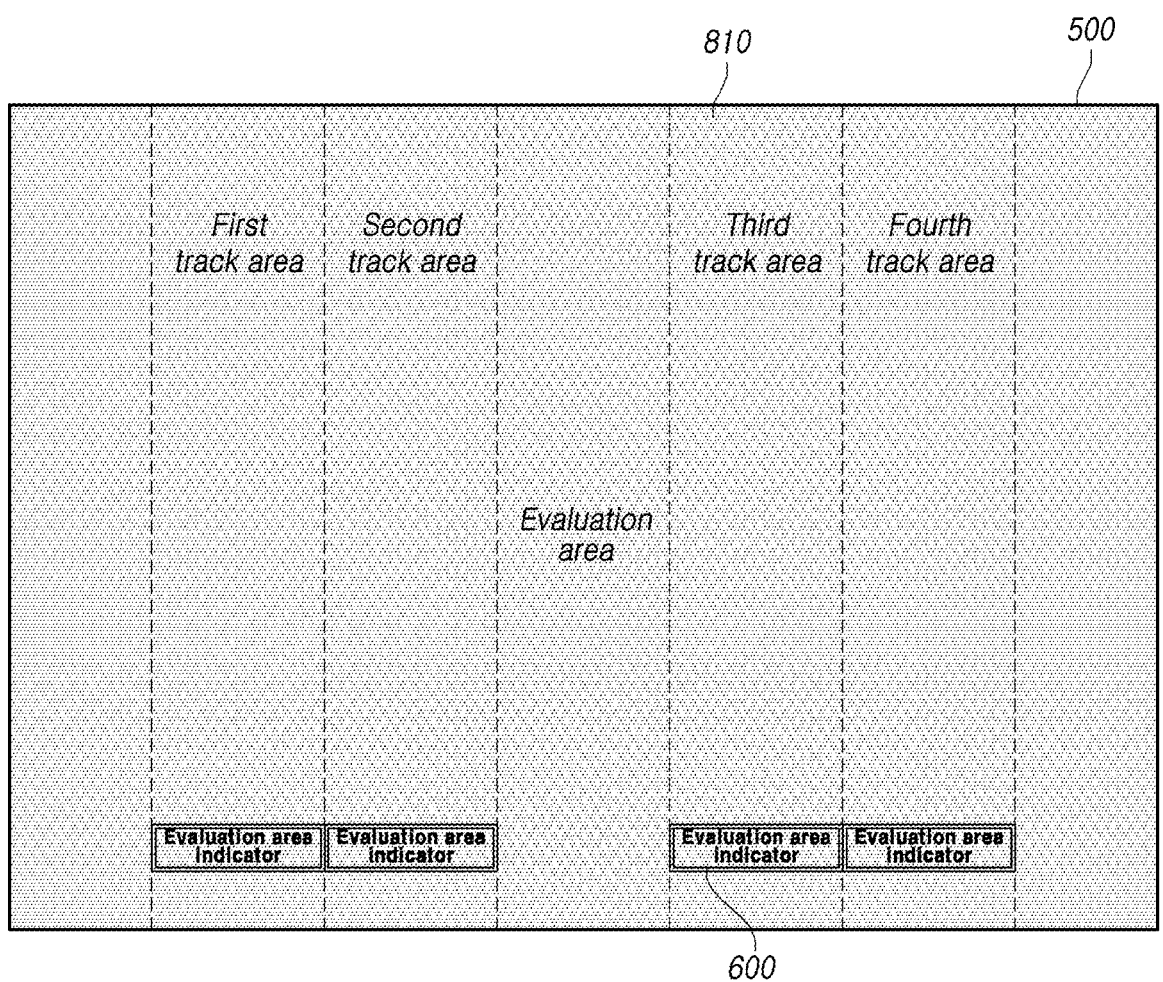
FIG. 8 illustrates a change in size of an evaluation area to the entire game screen according to an embodiment.

FIG. 8 illustrates a change in size of an evaluation area to the entire game screen according to an embodiment.

As illustrated in FIG. 8, the size of the evaluation area may be expanded from that of the evaluation area 600 that has been set in advance with regard to a specific note, thereby setting a change evaluation area 810 for processing the corresponding note over the entire game screen 500. For example, in order to process a specific note, the evaluation area determining function 130 may change the evaluation area 600 such that the size of the change evaluation area 810 is changed to that of the entire game screen 500.

In this case, the user generates an input signal for processing the corresponding note inside the change evaluation area 810 that has been changed, and the change in the monotonous note evaluation condition prevents the user from losing interest in the game.

Figure 9:
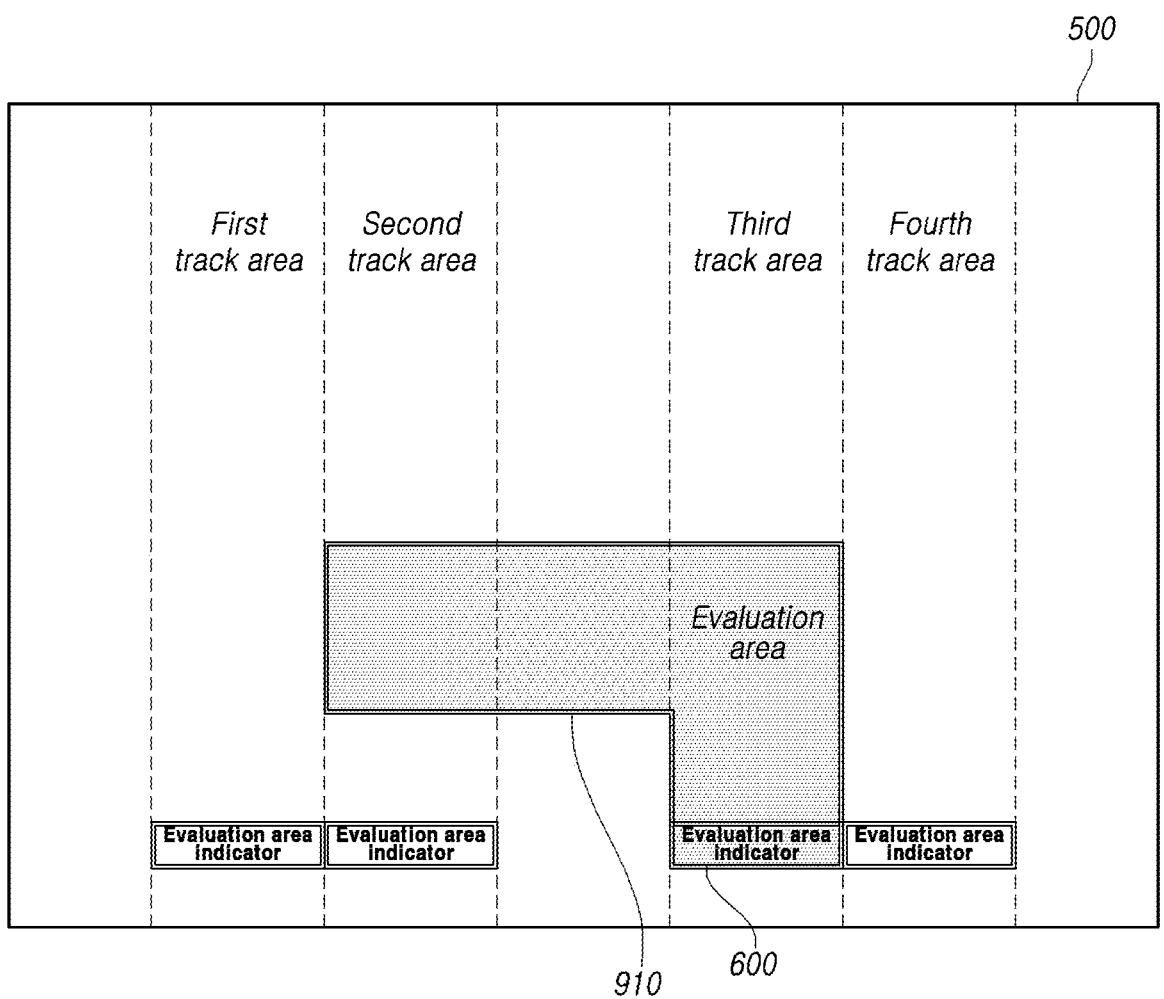
FIG. 9 illustrates a change in shape of an evaluation area according to an embodiment.

FIG. 9 illustrates a change in shape of an evaluation area according to an embodiment.

Referring to FIG. 9, not only the size but also the shape of the evaluation area 600 can be changed. For example, in order to process a specific note, the shape and size of the evaluation area 600 can be changed to a specific shape as indicated by reference numeral 910. In this case, an evaluation area indicator for indicating the change evaluation area 910 that has been changed may be set/displayed.

Although changes in the shape and size of evaluation areas according to some embodiments have been described above, evaluation areas may be changed to various shapes and sizes according to preset note characteristic information. In addition, although evaluation area sizes have been described in this specification to facilitate understanding, the same technical idea is applicable to evaluation area shapes and evaluation area colors. For example, the timepoint to change the evaluation area size may be identically applied to the timepoint to change the shape or color of the evaluation area.

Moreover, the size and shape of an evaluation area are changed with reference to note characteristic information of a specific note, and may also be set differently, even in the case of the same note, according to environment setting factors such as the game proceeding order, the level of difficulty of the game, and music elements inside the game.

For example, the size of an evaluation area regarding a specific note may be changed to that of the corresponding track area at the first level of game difficulty, and the size of the evaluation area regarding the same specific note may be changed to that of the entire game screen at the second level of game difficulty.

As another example, in connection with a single game unit played by the user (for example, from the start to the end of a specific song), different settings may be made in connection with the evaluation area change regarding a specific note in the front-half and rear-half parts thereof.

As another example, even in the case of the same note, different settings may be made regarding the evaluation area change according to the game play sound source along which the corresponding note is displayed.

Besides, the size, shape, and color of evaluation areas may be changed according to different standards according to the game running device, user information, and the game playing time zone.

Hereinafter, an embodiment regarding the timepoint at which the above-mentioned changes in size, shape, and color of evaluation areas occur will be described.

Figure 10:
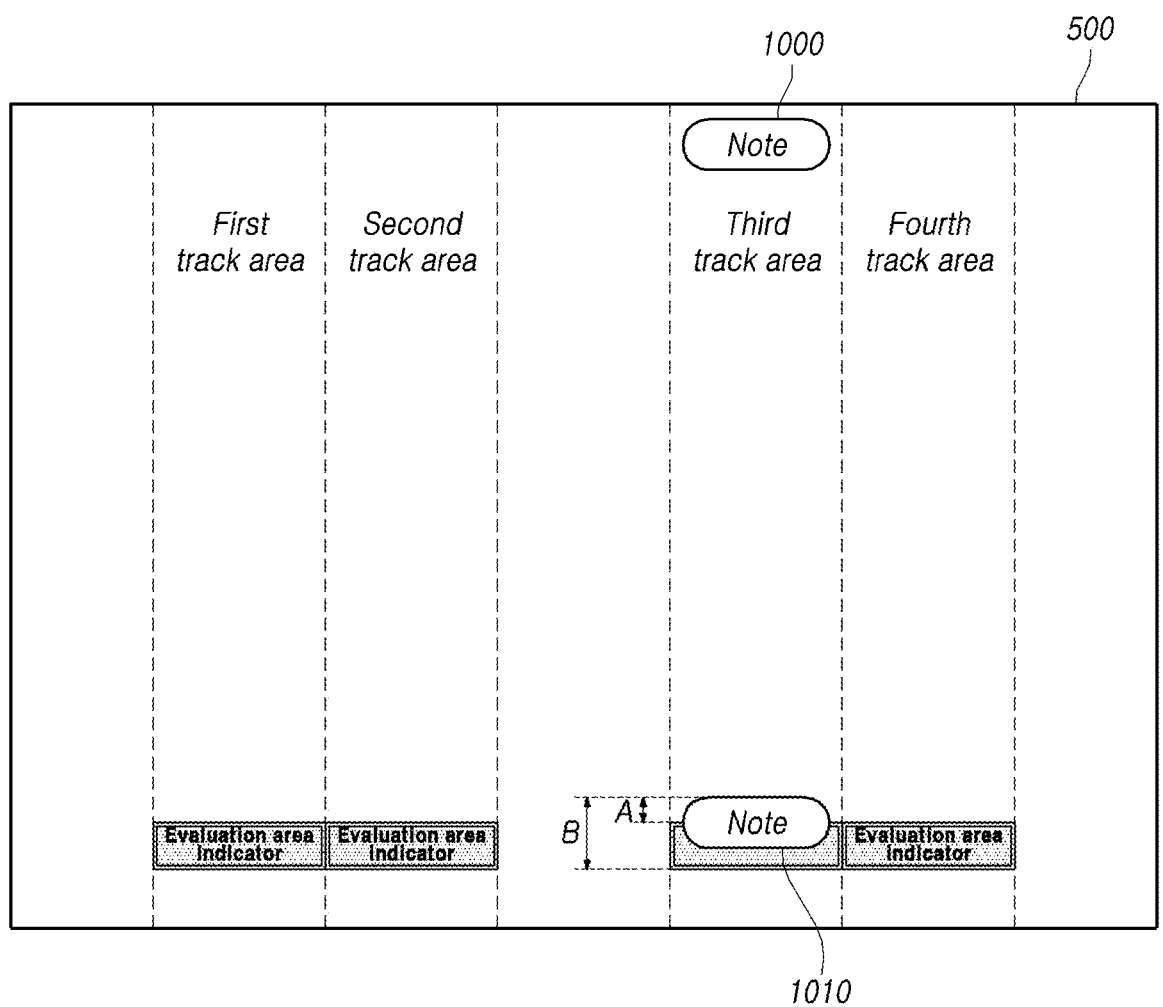
FIG. 10 illustrates a timepoint at which the size of an evaluation area is changed according to an embodiment.

FIG. 10 illustrates a timepoint at which the size of an evaluation area changes according to an embodiment.

Referring to FIG. 10, when it is confirmed that there is a need to change the size of an evaluation area, the evaluation area determining function 130 may change the size of the evaluation area for processing the note at the timepoint at which the note 1000 is displayed on the screen 500.

For example, when a specific note 1000 having note characteristic information that requires an evaluation area size change is displayed on the game screen 500, the evaluation area for processing the corresponding specific note 1000 may be changed and determined from the preset evaluation area to a change evaluation area, at least one selected from the size, shape, and color of which has been changed.

Alternatively, when there exists another note that moves toward the evaluation area indicator prior to the specific note 1000 that requires an evaluation area size change, the evaluation area for processing the specific note 1000 may be changed after confirming whether or not the corresponding different note is processed successfully. This may be applied to a case in which multiple notes are successively generated and displayed on the game screen 500.

Meanwhile, when it is determined that the size of an evaluation area needs to be changed, the evaluation area determining function 130 may change the size of the evaluation area for processing the note at the timepoint at which the note 1010 is positioned within a preset range with regard to the evaluation area indicator of the evaluation area.

For example, when the distance A between a note 1010 that requires an evaluation area size change and the upper end of an evaluation area indicator of a preset evaluation area on the game screen 500 is within a preset reference distance, a change evaluation area for processing the corresponding note 1010 may be determined. Alternatively, when the distance B between a note 1010 that requires an evaluation area size change and the lower end of an evaluation area indicator of an evaluation area on the game screen 500 is within a preset reference distance, a change evaluation area for processing the corresponding note 1010 may be determined. Although distance calculation with reference to the upper end of the note 1010 is exemplarily illustrated in FIG. 10, it is possible to calculate the distance with reference to the lower end of the note 1010 or the center of the note 1010. Likewise, it is possible to calculate the distance with reference to the center of the evaluation area.

In this manner, the evaluation area determining function 130 may determining whether or not to change the size of the evaluation area regarding the corresponding note 1010 with reference to the distance between the note 1010 and the reference evaluation area.

Meanwhile, the evaluation area determining function 130 may determine to change the size of the evaluation area for processing the note when an input signal is received at a timepoint at which the note 1010 is positioned within a preset first range with reference to the evaluation area indicator of the evaluation area.

For example, when the distance between the note 1010 and the reference evaluation area is within a preset reference distance (first range) as mentioned above, the evaluation area determining function 130 may additionally confirm whether or not a user input signal has occurred and then determine whether or not to change the size of the evaluation area for processing the corresponding note 1010. That is, the evaluation area regarding the corresponding note 1010 may not change if no user input signal is generated although the note 1010 has entered range A or B, of if an input signal is generated at a timepoint that deviates the preset time interval.

Figure 11:
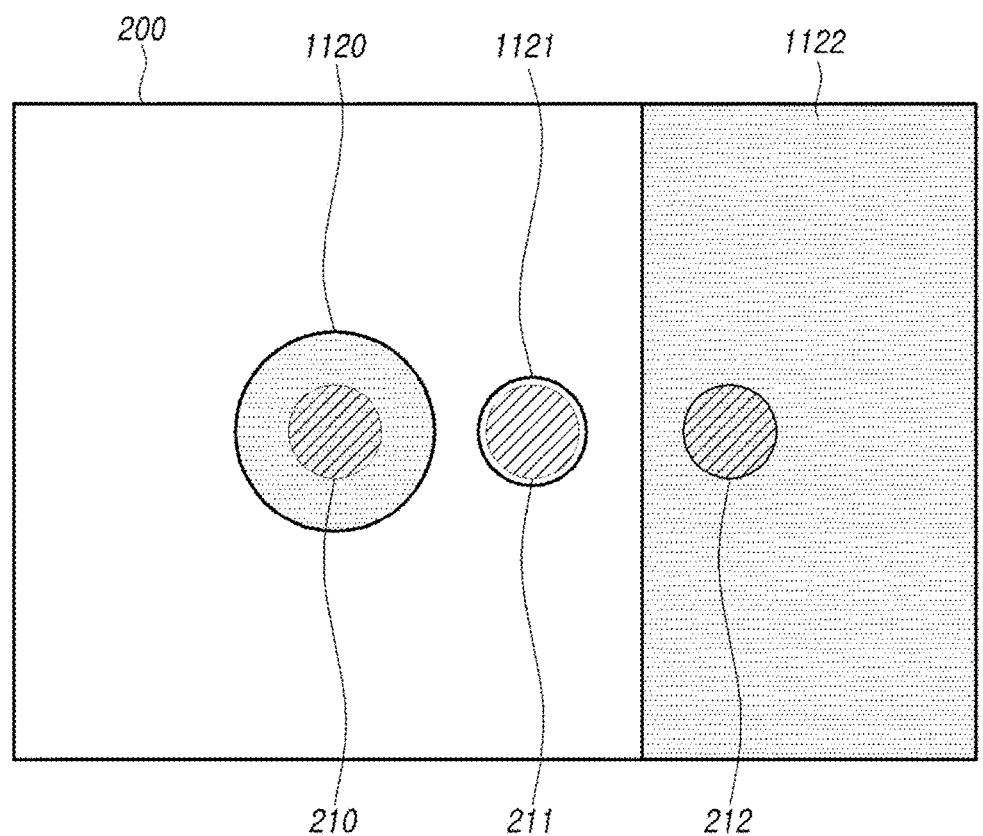
FIG. 11 illustrates an operation of changing evaluation areas with regard to respective notes according to an embodiment.

Moreover, the above-mentioned timepoint to change the size of the evaluation area may be set differently, even for the same note, according to environment setting factors such as the game proceeding order, the level of difficulty of the game, and music elements inside the game. FIG. 11 to FIG.

13 illustrate exemplary cases in which evaluation areas change when the game screen is configured as described with reference to FIG. 2 to FIG. 4.

FIG. 11 illustrates an operation of changing evaluation areas with regard to respective notes according to an embodiment.

Referring to FIG. 11, notes 210, 211, and 212 may be displayed when the game screen 200 is configured as in FIG. 2. When the above-mentioned condition for a change timepoint is set at the timepoint for processing the note 210, and when the corresponding change timepoint arrives, it is confirmed whether or not there is a need to change the evaluation area of the note 210. If it is confirmed that an evaluation area change is necessary according to characteristic information of the note 210, and if the corresponding note characteristic information has been set such that the evaluation area needs to be expanded at a predetermined ratio, the evaluation area of the note 210 may be expanded from the evaluation area that overlaps the note 210 to the area 1120 by applying a predetermined ratio. If necessary, the evaluation area indicator may also be expanded and displayed as the indicator 1120, and may not be displayed.

To the contrary, note characteristic information of the note 211 may include no condition regarding the evaluation area change, and, in this case, the evaluation area 1121 of the note 211 is not changed but is maintained.

Alternatively, if an evaluation area change is necessary as in the case of the note 212, but if the evaluation area changing method included in the note characteristic information instructs that the same be expanded to a partial area of the game screen 200, the evaluation area may be expanded into the change evaluation area 1122.

Figure 12:
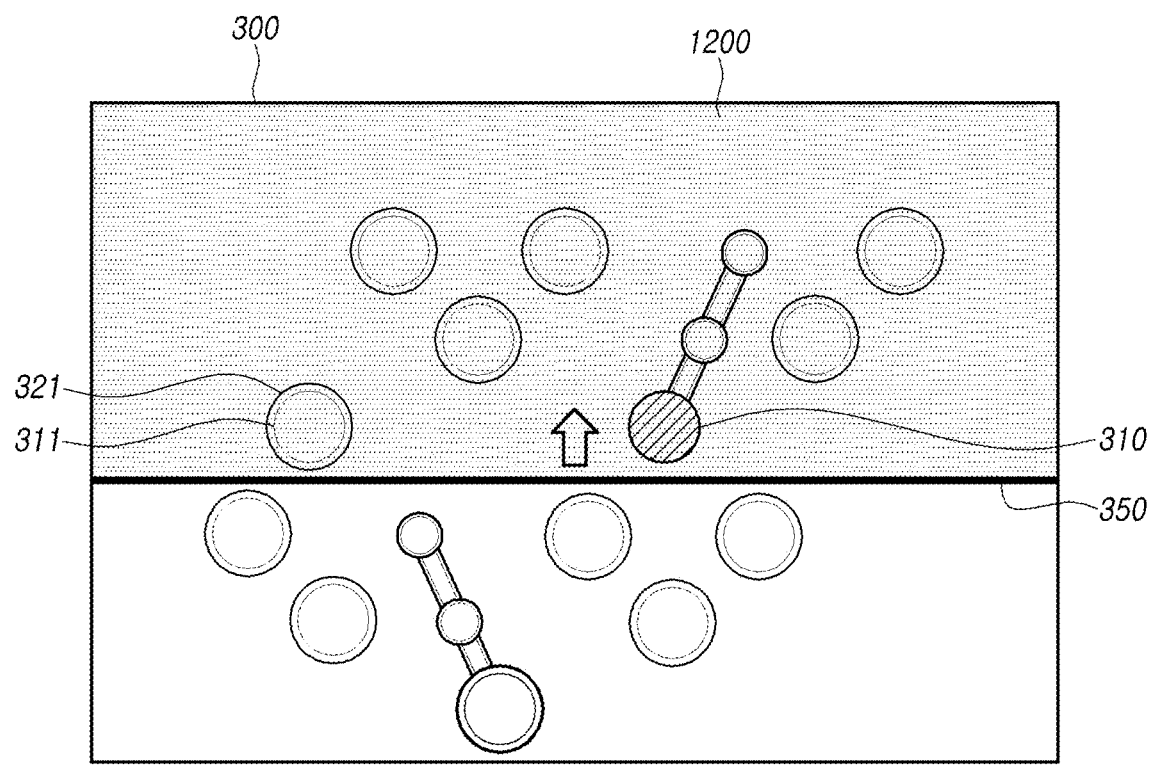
FIG. 12 illustrates an operation of changing an evaluation area on a different game screen according to an embodiment.

FIG. 12 illustrates an operation of changing an evaluation area on a different game screen according to an embodiment.

Referring to FIG. 12, when the game screen 300 is configured as in FIG. 3, and when the evaluation area indicator 350 moves such that the timepoint to process notes 310 and 310 arrives, the evaluation area may be changed according to the condition regarding the timepoint to change the evaluation area.

In the case of the note 311, note characteristic information may be set such that no evaluation area change is needed, and the evaluation area 321 may be maintained in such a case. If the note characteristic information requires an evaluation area change in the case of the note 310, the evaluation area may be changed into the change evaluation area 1200. In this case, the change evaluation area 1200 may be maintained from the starting point of the note 310 to the end point thereof, and the user may acquire a confirmation that the corresponding note 310 is processed successfully by conducting a control such that the input signal is continuously maintained inside the change evaluation area 1200. Alternatively, the user may acquire a confirmation that the corresponding note 310 is processed successfully by conducting a control such that the input signal is continuously maintained inside the change evaluation area 1200, and the coordinate of the input signal is continuously changed.

Figure 13:
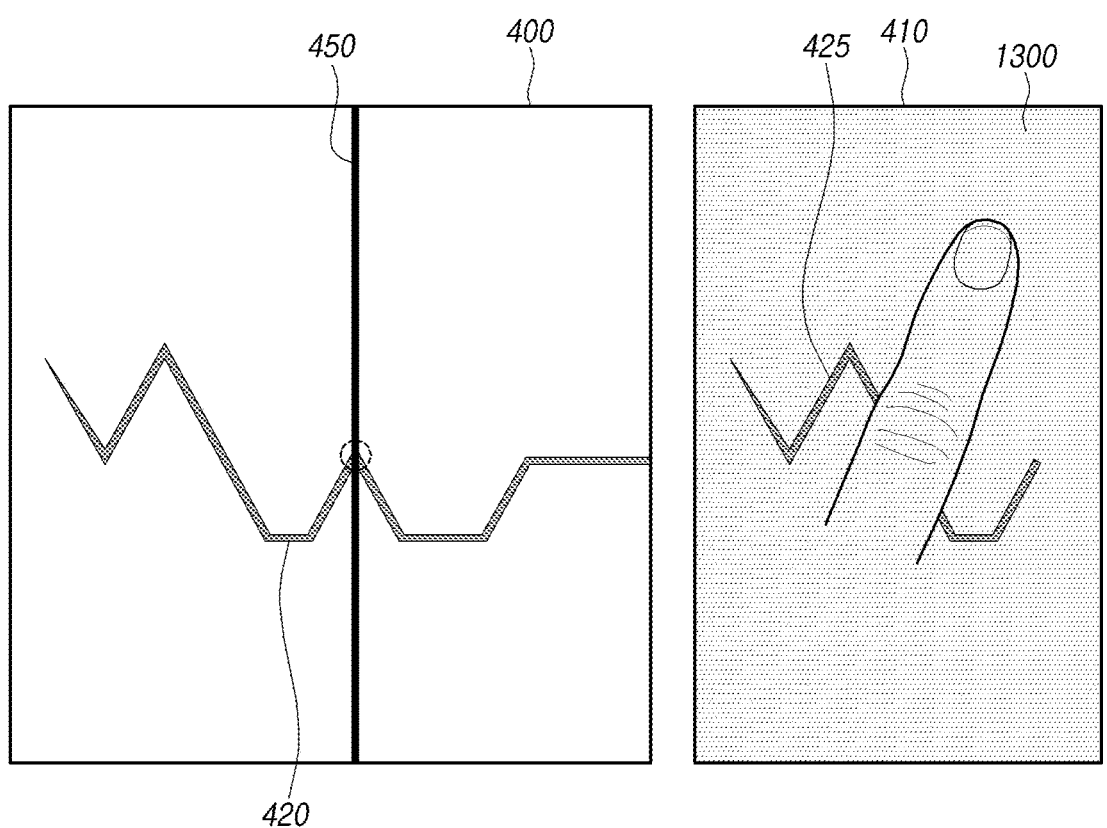
FIG. 13 illustrates an operation of changing an evaluation area when the game screen and the input screen are separated according to an embodiment.

FIG. 13 illustrates an operation of changing an evaluation area when the game screen and the input screen are separated according to an embodiment.

Referring to FIG. 13, a note 420 and an evaluation area indicator 450 may be displayed on a game screen 400 as in FIG. 400. In this case, note characteristic information of the note 420 may include a condition to change the evaluation area at a predetermined timepoint. When the timepoint to change the evaluation area is triggered, the evaluation area may be changed to the change evaluation area.

In the case of FIG. 13, a separate input screen 410 may be configured such that the evaluation area may be changed with reference to the input screen 410 into the change evaluation area 1300.

For example, the note 420 may be processed as time elapses, and the user, in order to process the same, may input an input signal, through a touch, according to the shape of the note 420 on the input screen 410. In this case, as the input signal is received, an input pattern 425 regarding the input signal may be displayed on the input screen 410.

If the evaluation area is changed at a predetermined timepoint according to a condition included in the note characteristic information such that a change evaluation area 1300 is set, the user may generate an input signal such that the input signal is continuously maintained inside the change evaluation area 1300 and is continuously moved. That is, the input pattern 425 and the note 420 have the same shape until the timepoint at which the change evaluation area 1300 is determined, but, since the timepoint at which the change evaluation area 1300 is triggered, the evaluation condition can be satisfied regardless of the position on the input screen 410 in which the input signal is inputted. Accordingly, the input pattern 425 and the note 420 may have different shapes.

As such, determination of the evaluation area may vary depending on the game screen, and the present embodiment is applicable to any game screen to which the present technical idea for changing at least one selected from the position, size, and shape of the evaluation area, described above, can be applied.

Figure 14:
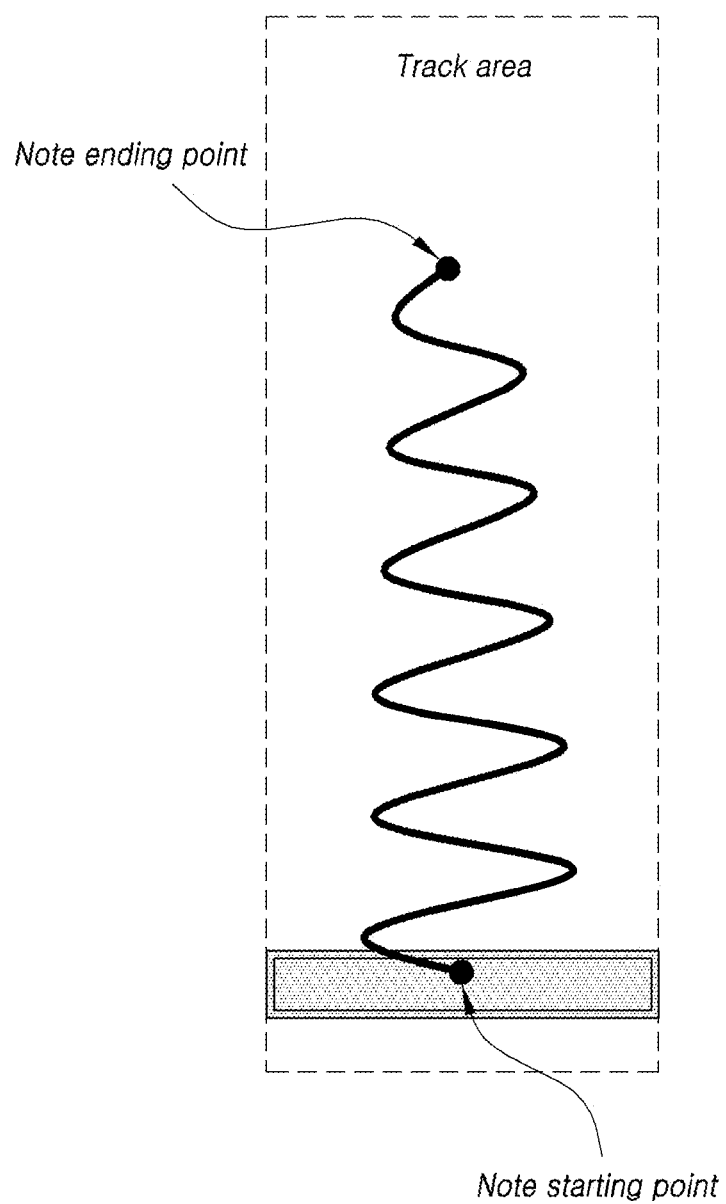
FIG. 14 illustrates a condition for confirming that a note is processed successfully according to an embodiment.

FIG. 14 illustrates a condition for confirming that a note is processed successfully according to an embodiment.

When the size of an evaluation area for processing a note is changed, the evaluation function 140 may confirm whether or not the corresponding note is processed successfully with reference to the change evaluation area that has been changed. For example, the evaluation function 140 may confirm that the note is processed successfully when an input signal is received at a timepoint at which the note is positioned within a preset range with reference to the evaluation area indicator of the evaluation area, and when the input signal is continuously maintained for a predetermined time inside the change evaluation area. That is, in the case of a note having note characteristic information including an evaluation area change, successful processing of the corresponding note may be evaluated on the basis of whether the user's input signal continues seamlessly for a predetermined time within the change evaluation area. In addition, in the case of a note having note characteristic information including an evaluation area change, successful processing of the corresponding note may be evaluated on the basis of whether or not the user's input signal continues seamlessly for a predetermined time within the change evaluation area, and whether or not the coordinate of the input signal changes continuously (whether or not the input signal moves continuously). In this case, the direction of continued movement of the input signal, the shape thereof, and the type thereof may not be considered. Alternatively, the time of duration of the input, the direction of movement of the touch signal, whether or not the same moves, and the shape following the movement of the input signal may be considered additionally.

Referring to FIG. 14, in the case of a note having note characteristic information including an evaluation area change, the same may be displayed so as to include a starting point and an end point that are connected by a predetermined length. In this case, the evaluation function 140 may primarily confirm whether or not a user input signal has occurred at a timepoint at which the starting point of the note and the evaluation area indicator of the preset evaluation area are positioned within a preset first range. If it is primarily confirmed that no user input signal has occurred, or if the same has occurred faster than the reference, it may be confirmed that processing of the corresponding note is a failure.

When it is primarily confirmed that the user input signal has occurred at the present reference timepoint, the evaluation function 140 may confirm whether or not the corresponding note is processed successfully on the basis of whether the user's input signal is continuously maintained and moved until the timepoint at which the ending point of the corresponding note and the evaluation area indicator of the evaluation area are positioned within a second preset range.

In this case, at least one selected from the position, size, shape, and color of the evaluation area may be changed as described above, and the change evaluation area that has been changed may be used as a basis to confirm whether or not the user input signal continues. As an example, when the evaluation area is expanded to the entire game screen, and when the user input signal continuously moves across the entire game screen, it may be confirmed that the corresponding note is processed successfully.

More specifically, it may be confirmed that the corresponding note is processed successfully when the user input signal starts at the timepoint at which the starting point of the note enters the evaluation arrange of the preset evaluation area, when the user's touch input signal continues seamlessly with reference to the entire change evaluation area that has changed, and when the input position of the input signal changes continuously (moves continuously).

In addition, as described above, when the user input signal moves continuously within the changed evaluation area, it may be confirmed that the corresponding note is processed successfully by showing a preset pattern or movement direction as an additional evaluation element, or by using the result of confirming whether or not the shape of the note and the movement pattern are identical.

Although an exemplary note including a predetermined number of inflection points is illustrated in FIG. 14, the shape, color, size, type, and the like of the corresponding note may be set variously.

Respective functions of the present disclosure described above may all be implemented as a program and included in a computer-readable recording medium.

Besides, individual functions included in the recording medium of the present disclosure may all be implemented through respective configurations or operations of respective steps described below.

An example of the computer-readable recording medium includes a ROM, a RAM, a CD-ROM, a magnetic tape, a floppy disk, an optical data storing device, and the like, and also includes an implementation in the form of a carrier wave (for example, transmission through the Internet). In addition, the computer-readable recording medium may have a code stored therein and executed accordingly, which is distributed over computer systems or servers connected by a network, and which can be read by computers in a distributed manner.

Furthermore, functional programs, codes and code segments for the implementing the present disclosure may be easily inferred by programmers in the art to which the present disclosure pertains.

As an example, a recording medium storing a program for executing a game method according to an embodiment of the present disclosure may have such an application stored therein such that the application is stored in a web server that provides a desired terminal with the application, and thus used for a web store technology. In addition, the recording medium storing a program for executing a game method according to an embodiment of the present disclosure may be stored in a game server or the like and used for a game service technology for transmitting the same to a game control device.

According to the present disclosure, as described above, it is possible to provide a game configured such that display and the like of constituent elements on the game screen are controlled more variously, thereby enabling various game types. This can further increase the user's interest in the game. In addition, the present disclosure can provide a game configured such that the user's manipulation can be evaluated in a more diversified, detailed, and precise manner.

Even if it was described above that all of the components of an embodiment of the present disclosure are coupled as a single unit or coupled to be operated as a single unit, the present disclosure is not necessarily limited to such an embodiment. That is, at least two elements of all structural elements may be selectively joined and operate without departing from the scope of the present disclosure. Further, all structural elements may be implemented in independent hardware respectively, but some or all of the structural elements may be selectively combined and implemented in computer programs which have a program module performing functions of some elements or all elements which are combined in one or more pieces of hardware. Codes and code segments forming the computer program can be easily conceived by an ordinarily skilled person in the technical field of the present disclosure. Such a computer program may implement the embodiments of the present disclosure by being stored in a computer readable storage medium, and being read and executed by a computer. A storage medium for the computer program may include a magnetic recording medium, an optical recording medium, a carrier wave medium and the like.

Hereinafter, a game control device and a game control method for implementing the above-mentioned functions will be described. That is, the recording medium described with reference to FIG. 1 to FIG. 14 can provide the user with a game through the game control device, and may also implemented as a game control method implemented by the game control device. Although detailed descriptions of some embodiments or some operations described with reference to FIG. 1 to FIG. 14 may be omitted in the following, it is solely for avoiding repeating the same descriptions, and the above-mentioned game control device or the game control method can perform the same functions as those included in the above-mentioned recording medium.

Meanwhile, assuming that the game control device is a communication device, such as a smartphone, capable of communicating with a computer system or a server through a network, the game control device may communicate with a computer system or a server, which stores a recording medium storing a program for executing a game method according to an embodiment of the present disclosure, may read the program stored in the recording medium, and may execute the game.

Figure 15:
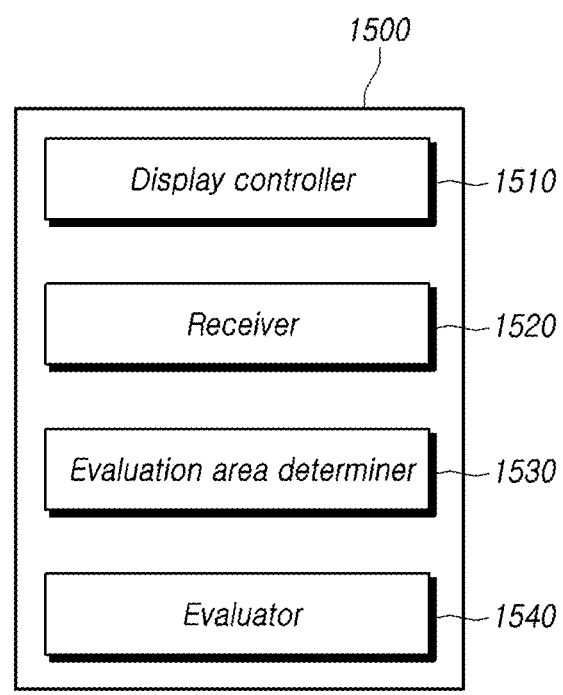
FIG. 15 is a block diagram illustrating the configuration of a game control device according to an embodiment.

FIG. 15 is a block diagram illustrating the configuration of a game control device according to an embodiment.

Referring to FIG. 15, a game control device 1500 may include: a display controller 1510 configured to conduct a control such that a note and an evaluation area indicator that indicates an evaluation area are displayed on a game screen, and to conduct a control such that at least one selected from the note and the evaluation area indicator is output while moving in a preset direction; a receiver 1520 configured to receive an input signal of a user; an evaluation area determiner 1530 configured to determine at least one selected from the position of a preset evaluation area, the shape thereof, and the size thereof on the basis of note characteristic information that is set with regard to each note; and an evaluator 1540 configured to confirm whether or not the note is processed successfully on the basis of an input signal and information regarding proximity of the evaluation area indicator and the note.

The display controller 1510 conducts a control such that a note and an evaluation area indicator that indicates an evaluation area are displayed on a game screen. As needed, the display controller 1510 may set multiple areas as track areas on the game screen, and may conduct a control such that respective track areas are separately configured. Alternatively, the display controller 1510 may conduct a control such that an evaluation area indicator appears on the game screen with regard to each track area. The display controller 1510 function 110 may display evaluation area indicators such that the same are configured in various shapes and colors according to settings. For example, the display controller 1510 may display evaluation area indicators in various shapes, such as squares, circles, and ellipses, and there is no restriction on the color.

The display controller 1510 may control the output of a displayed note such that the same moves toward the position of the evaluation area indicator along the track area. Specifically, the display controller 1510 may display a note moving inside each track area configured on the game screen. Notes may be configured in various shapes and colors, and respective notes are displayed in different shapes and colors according to the acquired score or the function held by respective notes.

Alternatively, the display controller 1510 may conduct a control such that multiple notes are displayed on the game screen, and may conduct a control such that an evaluation area is displayed so as to overlap the notes. For example, the display controller 1510 may conduct a control such that a predetermined note is displayed on the game screen for a predetermined time, and may conduct a control such that, when the time to process the displayed predetermined note expires, or when processing of the corresponding note is completed according to the user's input signal, the displayed note is changed.

Meanwhile, the display controller 1510 may also display an evaluation area indicator for indicating an evaluation area on the game screen. For example, the evaluation area indicator may be displayed so as to move toward the note or toward the evaluation area as time elapses. Unlike this, the display controller 1510 may conduct a control such that the note is displayed while moving toward the evaluation area indicator. Alternatively, the display controller 1510 may conduct a control such that a time indicator is displayed on the game screen so as to evaluate the note. The time indicator may move toward the note, the evaluation area, or the evaluation area indicator during a predetermined time, and the user may generate an input signal with regard to the note or the evaluation area according to the position of the corresponding time indicator, thereby processing the corresponding note.

Besides, the display controller 1510 may control display of various effects necessary for the game.

Meanwhile, the game control device 1500 may receive an input signal that is generated by the user while performing the game. The user's input signal may be received through an input screen that is configured separately from the game screen on which the game situation is displayed. For example, in the case of a game device including a dual screen, one screen may display the game situation, and the other screen may be set for the purpose of receiving the user's touch input signal.

The game control device 1500 may include an evaluation area determiner 1530 for determining an evaluation area according to the game situation. The evaluation area determiner 1530 may determine at least one selected from the position of the evaluation area, the shape thereof, and the size thereof according to note characteristic information that has been set with regard to each note in advance.

As an example, the evaluation area determiner 1530 may make a determination such that an evaluation area is positioned to overlap at least one note displayed on the game screen as the game proceeds. Alternatively, it may be determined that an evaluation area is formed to successively overlap a note as the game proceeds.

As another example, the evaluation area determiner 1530 may determine at least one selected from the position of an evaluation area, the size thereof, and the shape thereof such that, when the evaluation area is fixed and the note moves, the evaluation area is positioned in a specific position.

As another example, the evaluation area determiner 1530 may make a determination such that, when the note is fixed and the evaluation area moves, the evaluation area is formed in a specific position, and at least one selected from the corresponding position, the size, and the shape is changed as the game proceeds.

Meanwhile, the evaluation area determiner 1530 may change the evaluation area according to at least one selected from proceeding of the game, note characteristic information, and a preset trigger requirement. The following description will be made on the basis of a size change of the evaluation area, but the same can be applied to the position, size, shape, and the like. Alternatively, the same can be applied to a change by a combination of at least two selected from the position, size, and shape.

For example, the evaluation area determiner 1530 may include the function of confirming whether or not there is a need to change the evaluation area with regard to the note on the basis of note-specific evaluation requirement information included in the note characteristic information, and determining at least one selected from the position of the change evaluation area for processing the note, the size thereof, the shape thereof, and the timepoint to change the same, according to the result of confirmation.

As an example, when it is confirmed that there is a need to change the size of the evaluation area, the evaluation area determiner 1530 may set the size of the change evaluation area for processing the note by increasing/decreasing the size of the evaluation area by a preset ratio. In this case, the evaluation area indicator may also be changed and displayed so as to indicate the change evaluation area that has been changed.

As another example, when it is confirmed that there is a need to change the evaluation area, the evaluation area determiner 1530 may set the size of the change evaluation area for processing the corresponding note such that the same is expanded to the entire game screen or to a partial area thereof.

As another example, when it is confirmed that there is a need to change the size of the reference evaluation area, the evaluation area determiner 1530 may change and determine the shape or position of the change evaluation area for processing the corresponding note.

Meanwhile, when it is confirmed that there is a need to change the evaluation area, the evaluation area determiner 1530 may select the change timepoint from the timepoint at which the corresponding note is displayed on the game screen and the timepoint at which the corresponding note is positioned within a predetermined range of the evaluation area indicator that indicates a preset evaluation area. For example, when an input signal is received at a timepoint at which the note is positioned within a preset range with reference to the evaluation area indicator that indicates the evaluation area, the evaluation area determiner 1530 may make a determination such that the size, position, or shape of the evaluation area is changed to that of the change evaluation area for processing the note.

In addition, when processing of the note that has triggered a change of the evaluation area is completed, or when it is confirmed that processing of the corresponding note has failed, the evaluation area determiner 1530 may change the position, shape, or position of the evaluation area to that of the existing evaluation area. Alternatively, the evaluation area determiner 1530 may redetermine the evaluation area on the basis of the next note characteristic information.

When the evaluation area is changed to a change evaluation area for processing the note, the evaluator 1540 may confirm whether or not the corresponding note is processed successfully with reference to the change evaluation area. For example, the evaluator 1540 may confirm that the note is processed successfully when an input signal is received at a timepoint at which the evaluation area indicator of the evaluation area and the note are positioned within a preset first range, and when the input signal is continuously maintained for a predetermined time inside the change evaluation area.

Alternatively, when a note is displayed to as to include s starting point and an end point that are connected by a predetermined length, the evaluator function 1540 may confirm that the corresponding note is processed successfully when the input signal is continuously maintained and continuously moved from a timepoint at which the starting point of the note and the evaluation area indicator of the evaluation area are positioned within a preset first range to a timepoint at which the end point of the note and the evaluation area indicator of the evaluation area are positioned within a preset second range.

Alternatively, the evaluator 1540 may confirm whether or not the note is processed successfully by further evaluating whether or not the shape that connects the starting point of the note and the end point thereof matches with the input pattern of the input signal that continues on the game screen or the input screen for a predetermined time.

Meanwhile, the above-mentioned notes for changing the evaluation area may be classified according to the form, shape, or color thereof. For example, a note is displayed so as to include a starring point and an end point that are connected by a predetermined length, and the evaluator 1540 may confirm that the note is processed successfully when a touch input signal continuously moves from a timepoint at which the starting point of the note reaches the evaluation area indicator of the reference evaluation area to a timepoint at which the end point of the note reaches the evaluation area indicator of the reference evaluation area.

Besides, the game control device 1500 can perform all of respective functions of the recording medium described above by means of the display controller 1510, the receiver 1520, the evaluation area determiner 1530, and the evaluator 1540.

A game control method, by which all operations of the game control device of the present disclosure described above are performed, will now be described.

Figure 16:
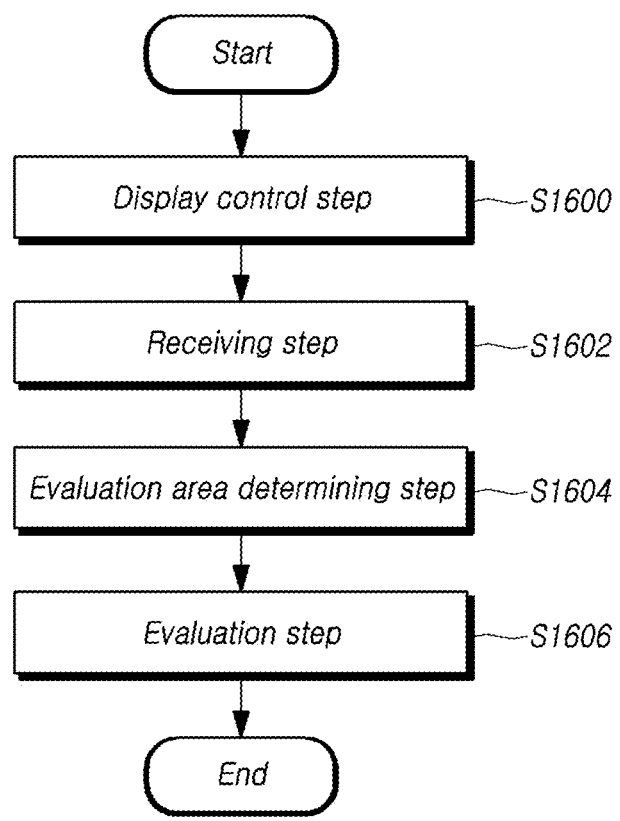
FIG. 16 is a flowchart illustrating a game control method according to an embodiment.

FIG. 16 is a flowchart illustrating a game control method according to an embodiment.

Referring to FIG. 16, the game control method may include: a display control step (S1600) of conducting a control such that a note and an evaluation area indicator that indicates an evaluation area are displayed on a game screen, and conducting a control such that at least one selected from the note and the evaluation area indicator is output while moving in a preset direction. The game control method may also include a receiving step (S1602) of receiving an input signal of a user. The game control method may also include an evaluation area determining step (S1604) of determining at least one selected from the position of a preset evaluation area, the shape thereof, and the size thereof on the basis of note characteristic information that is set with regard to each note. The game control method may also include an evaluation step (S1606) of confirming whether or not the note is processed successfully on the basis of an input signal and information regarding proximity of the evaluation area indicator and the note.

The display control step (S1600) conducts a control such that a note and an evaluation area indicator that indicates an evaluation area are displayed on a game screen. As needed, the display control step (S1600) may set multiple areas as track areas on the game screen, and may conduct a control such that respective track areas are separately configured. Alternatively, the display control step (S1600) may conduct a control such that an evaluation area indicator appears on the game screen with regard to each track area. The display control step (S1600) may display evaluation area indicators such that the same are configured in various shapes and colors according to settings. For example, the display control step (S1600) may display evaluation area indicators in various shapes, such as squares, circles, and ellipses, and there is no restriction on the color.

The display control step (S1600) may control the output of a displayed note such that the same moves toward the position of the evaluation area indicator along the track area. Specifically, the display control step (S1600) may display a note moving inside each track area configured on the game screen. Notes may be configured in various shapes and colors, and respective notes are displayed in different shapes and colors according to the acquired score or the function held by respective notes.

Alternatively, the display control step (S1600) may conduct a control such that multiple notes are displayed on the game screen, and may conduct a control such that an evaluation area is displayed so as to overlap the notes. For example, the display control step (S1600) may conduct a control such that a predetermined note is displayed on the game screen for a predetermined time, and may conduct a control such that, when the time to process the displayed predetermined note expires, or when processing of the corresponding note is completed according to the user's input signal, the displayed note is changed.

Meanwhile, the display control step (S1600) may also display an evaluation area indicator for indicating an evaluation area on the game screen. For example, the evaluation area indicator may be displayed so as to move toward the note or toward the evaluation area as time elapses. Unlike this, the display control step (S1600) may conduct a control such that the note is displayed while moving toward the evaluation area indicator. Alternatively, the display control step (S1600) may conduct a control such that a time indicator is displayed on the game screen so as to evaluate the note. The time indicator may move toward the note, the evaluation area, or the evaluation area indicator during a predetermined time, and the user may generate an input signal with regard to the note or the evaluation area according to the position of the corresponding time indicator, thereby processing the corresponding note.

Besides, the display control step (S1600) may control display of various effects necessary for the game.

Meanwhile, the game control method may include a receiving step (S1602) of receiving an input signal that is generated by the user while performing the game. The user's input signal may be received through an input screen that is configured separately from the game screen on which the game situation is displayed. For example, in the case of a game device including a dual screen, one screen may display the game situation, and the other screen may be set for the purpose of receiving the user's touch input signal.

The game control method may include an evaluation area determining step (S1604) of determining an evaluation area according to the game situation. The evaluation area determining step (S1604) may determine at least one selected from the position of the evaluation area, the shape thereof, and the size thereof according to note characteristic information that has been set with regard to each note in advance.

As an example, the evaluation area determining step (S1604) may make a determination such that an evaluation area is positioned to overlap at least one note displayed on the game screen as the game proceeds. Alternatively, it may be determined that an evaluation area is formed to successively overlap a note as the game proceeds.

As another example, the evaluation area determining step (S1604) may determine at least one selected from the position of an evaluation area, the size thereof, and the shape thereof such that, when the evaluation area is fixed and the note moves, the evaluation area is positioned in a specific position.

As another example, the evaluation area determining step (S1604) may make a determination such that, when the note is fixed and the evaluation area moves, the evaluation area is formed in a specific position, and at least one selected from the corresponding position, the size, and the shape is changed as the game proceeds.

Meanwhile, the evaluation area determining step (S1604) may change the evaluation area according to at least one selected from proceeding of the game, note characteristic information, and a preset trigger requirement. The following description will be made on the basis of a size change of the evaluation area, but the same can be applied to the position, size, shape, and the like. Alternatively, the same can be applied to a change by a combination of at least two selected from the position, size, and shape.

For example, the evaluation area determining step (S1604) may include the function of confirming whether or not there is a need to change the evaluation area with regard to the note on the basis of note-specific evaluation requirement information included in the note characteristic information, and determining at least one selected from the position of the change evaluation area for processing the note, the size thereof, the shape thereof, and the timepoint to change the same, according to the result of confirmation.

As an example, when it is confirmed that there is a need to change the size of the evaluation area, the evaluation area determining step (S1604) may set the size of the change evaluation area for processing the note by increasing/decreasing the size of the evaluation area by a preset ratio. In this case, the evaluation area indicator may also be changed and displayed so as to indicate the change evaluation area that has been changed.

As another example, when it is confirmed that there is a need to change the evaluation area, the evaluation area determining step (S1604) may set the size of the change evaluation area for processing the corresponding note such that the same is expanded to the entire game screen or to a partial area thereof.

As another example, when it is confirmed that there is a need to change the size of the reference evaluation area, the evaluation area determining step (S1604) may change and determine the shape or position of the change evaluation area for processing the corresponding note.

Meanwhile, when it is confirmed that there is a need to change the evaluation area, the evaluation area determining step (S1604) may select the change timepoint from the timepoint at which the corresponding note is displayed on the game screen and the timepoint at which the corresponding note is positioned within a predetermined range of the evaluation area indicator that indicates a preset evaluation area. For example, when an input signal is received at a timepoint at which the note is positioned within a preset range with reference to the evaluation area indicator that indicates the evaluation area, the evaluation area determining step (S1604) may make a determination such that the size, position, or shape of the evaluation area is changed to that of the change evaluation area for processing the note.

In addition, when processing of the note that has triggered a change of the evaluation area is completed, or when it is confirmed that processing of the corresponding note has failed, the evaluation area determining step (S1604) may change the position, shape, or position of the evaluation area to that of the existing evaluation area. Alternatively, the evaluation area determining step (S1604) may redetermine the evaluation area on the basis of the next note characteristic information.

When the evaluation area is changed to a change evaluation area for processing the note, the evaluation step (S1606) may confirm whether or not the corresponding note is processed successfully with reference to the change evaluation area. For example, the evaluation step (S1606) may confirm that the note is processed successfully when an input signal is received at a timepoint at which the evaluation area indicator of the evaluation area and the note are positioned within a preset first range, and when the input signal is continuously maintained for a predetermined time inside the change evaluation area.

Alternatively, when a note is displayed to as to include s starting point and an end point that are connected by a predetermined length, the evaluation step (S1606) may confirm that the corresponding note is processed successfully when the input signal is continuously maintained and continuously moved from a timepoint at which the starting point of the note and the evaluation area indicator of the evaluation area are positioned within a preset first range to a timepoint at which the end point of the note and the evaluation area indicator of the evaluation area are positioned within a preset second range.

Alternatively, the evaluation step (S1606) may confirm whether or not the note is processed successfully by further evaluating whether or not the shape that connects the starting point of the note and the end point thereof matches with the input pattern of the input signal that continues on the game screen or the input screen for a predetermined time.

Meanwhile, the above-mentioned notes for changing the evaluation area may be classified according to the form, shape, or color thereof. For example, a note is displayed so as to include a starring point and an end point that are connected by a predetermined length, and the evaluation step (S1606) may confirm that the note is processed successfully when a touch input signal continuously moves from a timepoint at which the starting point of the note reaches the evaluation area indicator of the reference evaluation area to a timepoint at which the end point of the note reaches the evaluation area indicator of the reference evaluation area.

Besides, the game control method may perform some or all of the operations of the game control device described above by changing the order, omitting a specific operation, or adding a specific operation as needed.

According to the present embodiments described above, the user can not only process notes simply according to the rhythm, but also can process notes according to changing evaluation areas. Accordingly, the user can feel more interested in the game and more immersed in the game.

In addition, since terms, such as "including," "comprising," and "having" mean that one or more corresponding components may exist unless they are specifically described to the contrary, it shall be construed that one or more other components can be included. All the terms that are technical, scientific or otherwise agree with the meanings as understood by a person skilled in the art unless defined to the contrary. Common terms as found in dictionaries should be interpreted in the context of the related technical writings not too ideally or impractically unless the present disclosure expressly defines them so.

In addition, terms such as "system", "processor", "controller", "component", "module", "interface", "model", and "unit" used in this specification may generally refer to computer-related entity hardware, a combination of hardware and software, software, or software that is being executed. For example, the above-mentioned constituent elements may be processes driven by processors, processors, controllers, control processors, objects, execution threads, programs, and/or computers, but are not limited thereto. For example, an application that is being executed by a controller or a processor, and the controller or the processor may all be constituent elements. One or more constituent elements may exist inside a process and/or an execution thread, and may be positioned in a single system or distributed over two or more systems.

The above embodiments of the present disclosure have been described only for illustrative purposes, and those skilled in the art will appreciate that various modifications and changes may be made thereto without departing from the scope and spirit of the disclosure. Therefore, the disclosed embodiments are not for the purpose of limiting the technical idea of the present disclosure, but for describing the same, and the scope of the present technical idea is not limited by such embodiments. The scope of the present disclosure shall be construed on the basis of the accompanying claims in such a manner that all of the technical ideas included within the scope equivalent to the claims belong to the present disclosure.

The invention claimed is:

1. A computer-readable recording medium storing a program for executing a game control, the program being configured to implement:

a display control function configured to conduct a control such that a note and an evaluation area indicator that indicates an evaluation area are displayed on a game screen, and to conduct a control such that at least one selected from the note and the evaluation area indicator is output while moving in a preset direction;

a receiving function configured to receive an input signal of a user;

an evaluation area determining function configured to determine at least one selected from the position of the evaluation area, the shape thereof, and the size thereof on the basis of note characteristic information that is set with regard to each note; and an evaluation function configured to confirm whether or not the note is processed successfully on the basis of the input signal and information regarding proximity of the evaluation area indicator and the note;

wherein the evaluation area determining function is configured to perform a function of confirming whether or not there is a need to change the evaluation area with regard to the note on the basis of note-specific evaluation requirement information that the note characteristic information comprises, and determining at least one selected from the position of a change evaluation area for processing the note, the size thereof, the shape thereof, and a change timepoint according to the result of confirmation; and wherein the evaluation area determining function is performed in response to whether or not the note is processed successfully.

2. The computer-readable recording medium storing a program of claim 1, wherein the evaluation area determining function is configured to performing a function of making a determination such that the evaluation area is successively positioned on at least one note displayed on the game screen as a game proceeds, and making a determination such that the evaluation area is positioned to overlap the at least one note.

3. The computer-readable recording medium storing a program of claim 1, wherein the display control function is configured to perform a function of conducting a control such that the note is output while moving toward the evaluation area indicator that indicates the evaluation area, or conducting a control such that the game screen is divided/configured into multiple track areas and displayed accordingly, and conducting a control such that the evaluation area is configured for each track area, and the note is output while moving toward the evaluation area along at least one track area selected from the multiple track areas.

4. The computer-readable recording medium storing a program of claim 1, wherein the evaluation area determining function is configured to perform a function of determining the size of the change evaluation area for processing the note by applying a preset ratio to the evaluation area when it is confirmed that there is a need to change the evaluation area.

5. The computer-readable recording medium storing a program of claim 1, wherein the evaluation area determining function is configured to perform a function of making a determination such that, when it is confirmed that there is a need to change the evaluation area, the size of the change evaluation area for processing the note is expanded to the entire game screen or to a partial area thereof.

6. The computer-readable recording medium storing a program of claim 1, wherein the evaluation area determining function is configured to perform a function of making a determination such that, when it is confirmed that there is a need to change the evaluation area, the evaluation area is changed to have the position of the change evaluation area for processing the note, the shape thereof, or the size thereof at a timepoint at which the note is displayed on the game screen or at a timepoint at which the evaluation area indicator of the evaluation area and the note are positioned within a preset range.

7. The computer-readable recording medium storing a program of claim 6, wherein the evaluation area determining function is configured to perform a function of making a determination such that, when the input signal is received at the timepoint at which the evaluation area indicator of the evaluation area and the note are positioned within the preset range, the evaluation area is changed to have the position of the change evaluation area for processing the note, the shape thereof, or the size thereof.

8. The computer-readable recording medium storing a program of claim 1, wherein the evaluation function is configured to perform, when the evaluation area is changed to the change evaluation area for processing the note, a function of confirming whether or not the note is processed successfully with reference to the change evaluation area.

9. The computer-readable recording medium storing a program of claim 8, wherein the evaluation function is configured to perform a function of confirming that the note is processed successfully when the input signal is received at a timepoint at which the evaluation area indicator of the evaluation area and the note are positioned within a preset first range, and when the input signal is continuously maintained for a predetermined time inside the change evaluation area.

10. The computer-readable recording medium storing a program of claim 9, wherein the note is displayed so as to comprise a starting point and an end point connected by a predetermined length, and the evaluation function is configured to perform a function of confirming that the note is processed successfully when the input signal is continuously maintained and moved from a timepoint at which the starting point of the note and the evaluation area indicator of the evaluation area are positioned within the preset first range to a timepoint at which the end point of the note and the evaluation area indicator of the evaluation area are positioned within a preset second range.

11. A game control device comprising:
a display controller configured to conduct a control such that a note and an evaluation area indicator that indicates an evaluation area are displayed on a game screen, and to conduct a control such that at least one selected from the note and the evaluation area indicator is output while moving in a preset direction;
a receiver configured to receive an input signal of a user;
an evaluation area determiner configured to determine at least one selected from the position of the evaluation area, the shape thereof, and the size thereof on the basis of note characteristic information that is set with regard to each note; and
an evaluator configured to confirm whether or not the note is processed successfully on the basis of the input signal and information regarding proximity of the evaluation area indicator and the note;
wherein the evaluation area determiner is configured to confirm whether or not there is a need to change the evaluation area with regard to the note on the basis of note-specific evaluation requirement information that the note characteristic information comprises, and to determine at least one selected from the position of a change evaluation area for processing the note, the size thereof, the shape thereof, and a change timepoint according to the result of confirmation; and
wherein the evaluation area determiner is activated in response to whether or not the note is processed successfully.

12. The game control device of claim 11, wherein the evaluator is configured to confirm, when the evaluation area is changed to the change evaluation area for processing the note, whether or not the note is processed successfully with reference to the change evaluation area.

13. A game control method comprising:
controlling a display by conducting a control such that a note and an evaluation area indicator that indicates an evaluation area are displayed on a game screen, and conducting a control such that at least one selected from the note and the evaluation area indicator is output while moving in a preset direction;
receiving an input signal of a user;
determining an evaluation area by determining at least one selected from the position of the evaluation area, the shape thereof, and the size thereof on the basis of note characteristic information that is set with regard to each note; and
performing evaluation by confirming whether or not the note is processed successfully on the basis of the input signal and information regarding proximity of the evaluation area indicator and the note;
wherein the determining an evaluation area is configured to confirm whether or not there is a need to change the evaluation area with regard to the note on the basis of note-specific evaluation requirement information that the note characteristic information comprises, and to determine at least one selected from the position of a change evaluation area for processing the note, the size thereof, the shape thereof, and a change timepoint according to the result of confirmation; and
wherein the determining the evaluation area is performed in response to whether or not the note is processed successfully.

* * * * *